United States Patent
Jiang et al.

(10) Patent No.: US 10,547,415 B2
(45) Date of Patent: Jan. 28, 2020

(54) SCALABLE TTI WITH ADVANCED PILOT AND CONTROL

(71) Applicant: QUALCOMM Incorporated, San Diego, CA (US)

(72) Inventors: Jing Jiang, San Diego, CA (US); Krishna Mukkavilli, San Diego, CA (US); Joseph Binamira Soriaga, San Diego, CA (US); Tingfang Ji, San Diego, CA (US); Chih Ping Li, San Diego, CA (US); John Smee, San Diego, CA (US); Naga Bhushan, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 233 days.

(21) Appl. No.: 14/958,656

(22) Filed: Dec. 3, 2015

(65) Prior Publication Data

US 2016/0269150 A1 Sep. 15, 2016

Related U.S. Application Data

(60) Provisional application No. 62/133,432, filed on Mar. 15, 2015.

(51) Int. Cl.
| | |
|---|---|
| *H04L 1/18* | (2006.01) |
| *H04L 1/00* | (2006.01) |
| *H04L 5/00* | (2006.01) |
| *H04L 12/801* | (2013.01) |

(52) U.S. Cl.
CPC .......... *H04L 1/1812* (2013.01); *H04L 1/0073* (2013.01); *H04L 1/1861* (2013.01); *H04L 5/0048* (2013.01); *H04L 47/12* (2013.01)

(58) Field of Classification Search
CPC ... H04L 1/1812; H04L 1/0073; H04L 1/1671; H04L 1/1854; H04L 1/1861; H04L 1/1825; H04L 1/1887; H04L 1/1893; H04L 5/0044; H04L 5/0048; H04L 47/12
See application file for complete search history.

(56) References Cited

U.S. PATENT DOCUMENTS

| | | | |
|---|---|---|---|
| 7,764,661 | B2 | 7/2010 | Heo et al. |
| 8,498,228 | B2 | 7/2013 | Lee et al. |
| 8,670,417 | B2 | 3/2014 | Park et al. |

(Continued)

FOREIGN PATENT DOCUMENTS

WO WO-2013138779 A1 9/2013

OTHER PUBLICATIONS

International Search Report and Written Opinion—PCT/US2016/020139—ISA/EPO—dated May 31, 2016.

*Primary Examiner* — Habte Mered
(74) *Attorney, Agent, or Firm* — Linda G. Gunderson; Loza & Loza LLP

(57) ABSTRACT

The disclosure relates in some aspects to a scalable transmission time interval (TTI) and hybrid automatic repeat request (HARQ) design. The TTI is scalable to, for example, achieve latency and/or efficiency tradeoffs for different types of traffic (e.g., mission critical traffic versus traffic with more relaxed latency requirements). In the event a longer TTI is employed, various techniques are disclosed for ensuring a fast turn-around HARQ, thereby maintaining a high level of communication performance.

60 Claims, 19 Drawing Sheets

(56) References Cited

U.S. PATENT DOCUMENTS

| | | | |
|---|---|---|---|
| 8,804,645 B2* | 8/2014 | Kim | H04W 72/0413 370/329 |
| 2007/0109988 A1* | 5/2007 | Sampath | H04L 1/0083 370/321 |
| 2008/0247479 A1* | 10/2008 | Ma | H04B 7/0452 375/260 |
| 2009/0060081 A1* | 3/2009 | Zhang | H04L 1/0026 375/267 |
| 2009/0259911 A1* | 10/2009 | Tseng | H04L 1/1812 714/748 |
| 2009/0296833 A1* | 12/2009 | Sawahashi | H04L 1/0007 375/260 |
| 2009/0307554 A1* | 12/2009 | Marinier | H04L 1/1812 714/748 |
| 2010/0182975 A1* | 7/2010 | Malladi | H04L 1/1664 370/330 |
| 2012/0243515 A1* | 9/2012 | Xue | H03M 13/23 370/336 |
| 2013/0242889 A1* | 9/2013 | Khoryaev | H04W 72/0413 370/329 |
| 2014/0044028 A1 | 2/2014 | Nammi et al. | |
| 2014/0071954 A1 | 3/2014 | Au et al. | |
| 2014/0307656 A1* | 10/2014 | Frost | H04L 1/0029 370/329 |
| 2016/0128039 A1* | 5/2016 | Lim | H04L 5/0053 370/330 |
| 2016/0359750 A1* | 12/2016 | Miklos | H04L 47/24 |
| 2017/0041103 A1* | 2/2017 | Maattanen | H04L 1/1671 |
| 2017/0181165 A1* | 6/2017 | Au | H04W 48/00 |

* cited by examiner

SCALABLE TTI WITH ADVANCED PILOT AND CONTROL

CROSS-REFERENCE TO RELATED APPLICATION(S)

This application claims priority to and the benefit of provisional patent application number 62/133,432 filed in the U.S. Patent and Trademark Office on Mar. 15, 2015, the entire content of which is incorporated herein by reference.

BACKGROUND

Field of the Disclosure

Aspects of the disclosure relate generally to wireless communication, and more specifically, but not exclusively, to techniques for supporting scalable transmission time intervals (TTIs).

Description of Related Art

Wireless communication networks are widely deployed to provide various communication services such as telephony, video, data, messaging, broadcasts, and so on. Such networks, which are usually multiple access networks, support communication for multiple users by sharing the available network resources. For example, in 3rd Generation Partnership Project (3GPP) Long Term Evolution (LTE), enhanced Node Bs (eNBs) provide network connectivity for user equipment (UE) within the coverage areas of the eNBs.

It may be desirable to improve wireless communication to achieve low latency and high reliability and efficiency. For example, some wireless communication networks employ a hybrid automatic repeat request (HARQ) scheme to improve communication reliability.

SUMMARY

The following presents a simplified summary of some aspects of the disclosure to provide a basic understanding of such aspects. This SUMMIT is not an extensive overview of all contemplated features of the disclosure, and is intended neither to identify key or critical elements of all aspects of the disclosure nor to delineate the scope of any or all aspects of the disclosure. Its sole purpose is to present various concepts of some aspects of the disclosure in a simplified form as a prelude to the more detailed description that is presented later.

In one aspect, the disclosure provides an apparatus configured for communication that includes a memory device and a processing circuit coupled to the memory device. The processing circuit is configured to: communicate data during a first transmission time interval (TTI) that includes a plurality of symbol time periods; and communicate feedback information based on the data during a second TTI that includes a plurality of symbol time periods and successively follows the first TTI.

Another aspect of the disclosure provides a method for a client device to establish connectivity for data traffic. The method includes: communicating data during a first transmission time interval (TTI) that includes a plurality of symbol time periods; and communicating feedback information based on the data during a second TTI that includes a plurality of symbol time periods and successively follows the first TTI.

Another aspect of the disclosure provides an apparatus configured for communication. The apparatus including: means for communicating data during a first transmission time interval (TTI) that includes a plurality of symbol time periods; and means for communicating feedback information based on the data during a second TTI that includes a plurality of symbol time periods and successively follows the first TTI.

Another aspect of the disclosure provides a non-transitory computer-readable medium storing computer-executable code, including code to: communicate data during a first transmission time interval (TTI) that includes a plurality of symbol time periods; and communicate feedback information based on the data during a second TTI that includes a plurality of symbol time periods and successively follows the first TTI.

Examples of additional aspects of the above follow. In some aspects, pilot information and/or control information is front-loaded in the symbol time periods of the first TTI.

In some aspects, the communicating of the data may include receiving the data; and the communicating: of the feedback information may include transmitting the feedback information. In this case, at least a portion of the data may be processed during the second TTI to generate the feedback information. In some aspects, at least another portion of the data may be processed during the first TTI to generate the feedback information.

In some aspects, the feedback information may include channel state feedback information. In this case, the data may be processed to generate the channel state feedback information.

In some aspects, the communicating of the data may include transmitting the data; and the communicating of the feedback information may include receiving the feedback information. In this case, at least a portion of the feedback information may be processed during the second TTI to determine whether to retransmit the data.

In some aspects, at least another portion of the feedback information may be processed during the first TTI to determine whether to retransmit the data.

In some aspects, the feedback information may include channel state feedback information. In this case, the channel state feedback information may be processed to determine whether to retransmit the data.

In some aspects, the feedback information may include pilot information and acknowledgement information. In some aspects, the pilot information and the acknowledgement information are communicated during a common symbol period. In some aspects, pilot information is front-loaded in the symbol time periods of the second TTI. In some aspects, the data may include mission critical traffic, which is required to be received and decoded successfully within a deadline.

In some aspects, a determination may be made as to whether first traffic is to be communicated, wherein the first traffic is associated with a first latency period that is different from a second latency period associated with second traffic currently being communicated. In this case, a scaled TTI for communicating the first traffic may be selected, wherein the scaled TTI specifies the plurality of symbol time periods for each of the first TTI and the second TTI, and the scaled TTI is associated with hybrid automatic repeat request (HARQ) communication during the second TTI. In some aspects, the scaled TTI is further associated with a time period for the HARQ communication being spread over a plurality of TTIs.

In some aspects, the feedback information may include a plurality of acknowledgement indications. In some aspects, the feedback information may include a plurality of pilot indications.

In some aspects, a length of each of the first TTI and the second TTI may be selected to match a processing and acknowledgement time interval.

In one aspect, the disclosure provides an apparatus configured for communication that includes a memory device and a processing circuit coupled to the memory device. The processing circuit is configured to: communicate data during a first transmission time interval (TTI) that includes a plurality of symbol time periods; and communicate feedback information based on the data during the first TTI.

Another aspect of the disclosure provides a method for a client device to establish connectivity for data traffic. The method includes: communicating data during a first transmission time interval (TTI) that includes a plurality of symbol time periods; and communicating feedback information based on the data during the first TTI.

Another aspect of the disclosure provides an apparatus configured for communication. The apparatus including: means for communicating data during a first transmission time interval (TTI) that includes a plurality of symbol time periods; and means for communicating feedback information based on the data during the first TTI.

Another aspect of the disclosure provides a non-transitory compute-readable medium storing computer-executable code, including code to: communicate data during a first transmission time interval (TTI), that includes a plurality of symbol time periods; and communicate feedback information based on the data during the first TTI.

Examples of additional aspects of the above follow. In some aspects, pilot information and/or control information is front-loaded in the symbol time periods of the first TTI.

In some aspects, the communicating of the data may include receiving the data; and the communicating of the feedback information may include transmitting the feedback information. In this case, at least a portion of the data may be processed during the first TTI to generate the feedback information.

In some aspects, at least another portion of the data may be processed during a second TTI that may include a plurality of symbol time periods and successively follows the first TTI to generate additional feedback information. In addition, this additional feedback information may be communicated.

In some aspects, the feedback information may include channel state feedback information. In this case, the data may be processed to generate the channel state feedback information.

In some aspects, the communicating of the data may include transmitting the data; and the communicating of the feedback information may include receiving the feedback information. In this case, at least a portion of the feedback information may he processed during the first to determine whether to retransmit the data.

In some aspects, at least another portion of the feedback information may he processed during a second TTI that may include a plurality of symbol time periods and successively follows the first to determine whether to retransmit the data.

In some aspects, the feedback information may include channel state feedback information. In this case, the channel state feedback information may be processed to determine whether to retransmit the data.

In some aspects, the feedback information may include pilot information and acknowledgement information. In some aspects, the pilot information and the acknowledgement information are communicated during a common symbol period. In some aspects, pilot information is frontloaded in symbol time periods that carry the feedback information.

In some aspects, the data may include mission critical traffic, which is required to be received and decoded successfully within a deadline.

In some aspects, a determination may be made as to whether first traffic is to be communicated, wherein the first traffic is associated with a first latency period that is different from a second latency period associated with second traffic currently being communicated. In this case, a scaled TTI for communicating the first traffic may be selected, wherein the scaled TTI specifies the plurality of symbol time periods for the first TTI, and the scaled TTI is associated with hybrid automatic repeat request (HARQ) communication during the first. In some aspects, the scaled TTI may be associated with a time period for the HARQ communication being spread over a plurality of TTIs.

In some aspects, the feedback information may include a plurality of acknowledgement indications. In some aspects, the feedback information may include a plurality of pilot indications.

In some aspects, a length of the first TTI may he selected to match a processing and acknowledgement time interval.

These and other aspects of the disclosure will become more fully understood upon a review of the detailed description, which follows. Other aspects, features, and implementations of the disclosure will become apparent to those of ordinary skill in the art, upon reviewing the following description of specific implementations of the disclosure in conjunction with the accompanying figures. While features of the disclosure may be discussed relative to certain implementations and figures below, all implementations of the disclosure can include one or more of the advantageous features discussed herein. In other words, while one or more implementations may be discussed as having certain advantageous features, one or more of such features may also be used in accordance with the various implementations of the disclosure discussed herein. In similar fashion, while certain implementations may be discussed below as device, system, or method implementations it should be understood that such implementations can be implemented in various devices, systems, and methods.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Some wireless communication networks employ a hybrid automatic repeat request (HARQ) scheme to improve communication reliability. In a typical HARQ scheme, a first apparatus that receives data from a second apparatus during a given TTI processes the data to determine whether the data was successfully received. The first apparatus then sends an acknowledgement message (e.g., an ACK or a NACK) to inform the second apparatus whether the data was successfully received. In the event the data was not successfully received (e.g., the first apparatus sent a NACK), the second apparatus retransmits the data. Thus, in some aspects, communication performance depends on the so-called round trip time (RTT) of the HARQ. In general, the HARQ RTT may be defined as the time period from the time of a first transmission (e.g., the time of the corresponding TTI) to the time of a retransmission (e.g., the time of the corresponding subsequent TTI). A shorter HARQ RTT means that retransmissions can be sent sooner.

Figure 1:
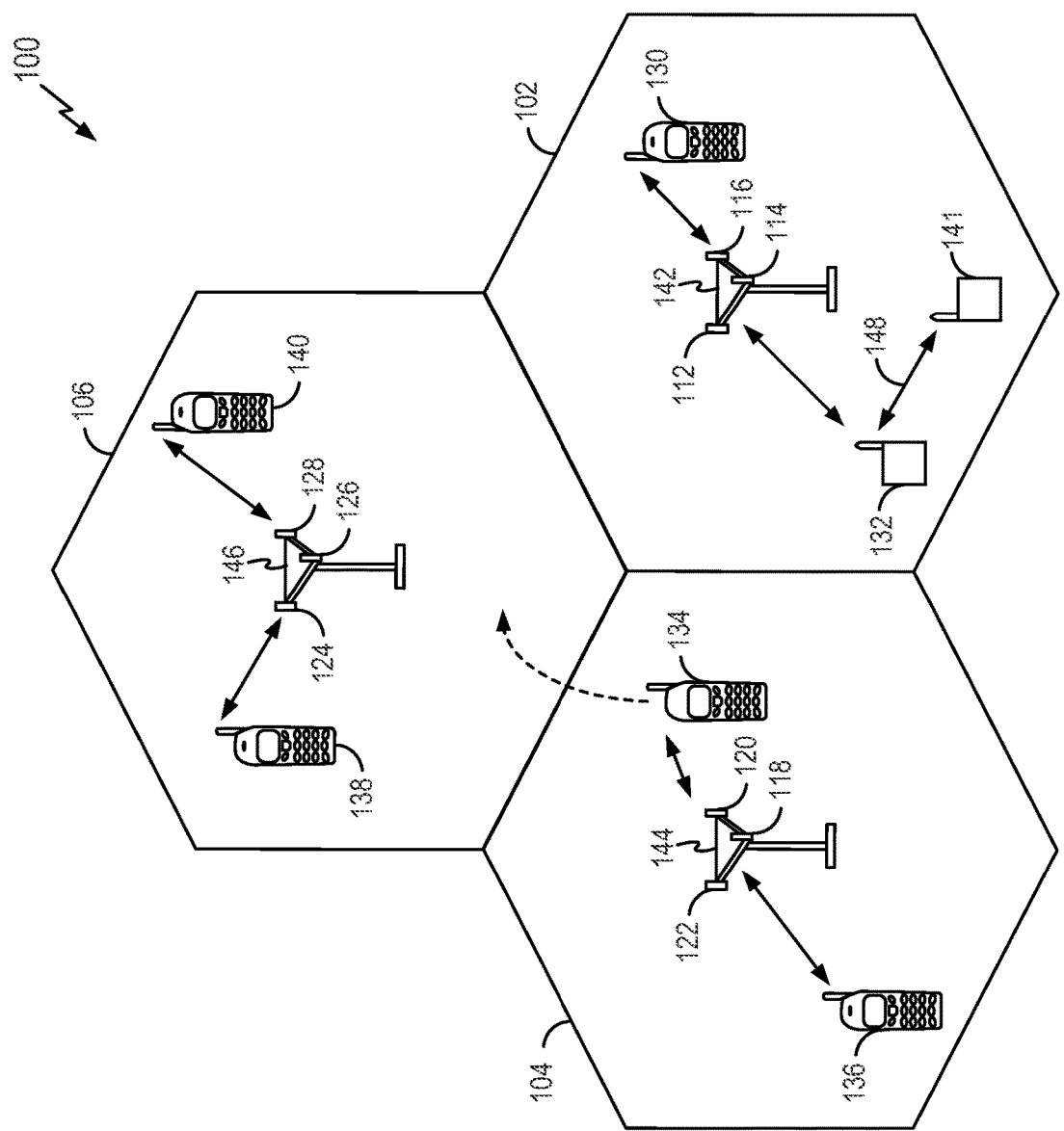
FIG. 1 is a block diagram illustrating an example of an access network in which one or more aspects of the disclosure may find application.

The various concepts presented throughout this disclosure may be implemented across a broad variety of communication systems, network architectures, and communication standards. Referring to FIG. 1, by way of example and without limitation, an access network 100 is shown in simplified form. The access network 100 can be implemented according to various network technologies including, without limitation, fifth generation (5G) technology, fourth generation (4G) technology, third generation (3G) technology, and other network architectures. Thus, various aspects of the disclosure may be extended to networks based on Long Term Evolution (LTE), LTE-Advanced (LTE-A) (in FDD, TDD, or both modes), Universal Mobile Telecommunications System (UMTS), Global System for Mobile Communications (GSM), Code Division Multiple Access (CDMA), Evolution-Data. Optimized (EV-DO), Ultra Mobile Broadband (LIMB), Institute of Electrical and Electronics Engineers (IEEE) 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

The access network 100 includes multiple cellular regions (cells), including cells 102, 104, and 106, each of which may include one or more sectors. Cells may be defined geographically, e.g., by coverage area. In a cell that is divided into sectors, the multiple sectors within a cell can be formed by groups of antennas with each antenna responsible for communication with ATs in a portion of the cell. For example, in cell 102, antenna groups 112, 114, and 116 may each correspond to a different sector. In cell 104, antenna groups 118, 120, and 122 may each correspond to a different sector. In cell 106, antenna groups 124, 126, and 128 may each correspond to a different sector.

cells 102, 104, and 106 may include several access terminals (ATs) that may be in communication with one or more sectors of each cell 102, 104, or 106. For example, ATs 130 and 132 may be in communication with an access point (AP) 142, ATs 134 and 136 may be in communication with an AP 144, and be in communication with an AP 146. The ATs also may support peer-to-peer communication. For example, the AT 132 may communicate directly with an AT 141 as represented by the wireless communication symbol 148. In various implementations, all AP may be referred to or implemented as a base station, a NodeB, an eNodeB, and so on; while an AT may be referred to or implemented as a user equipment (UE), a mobile station, and so on.

Figure 2:
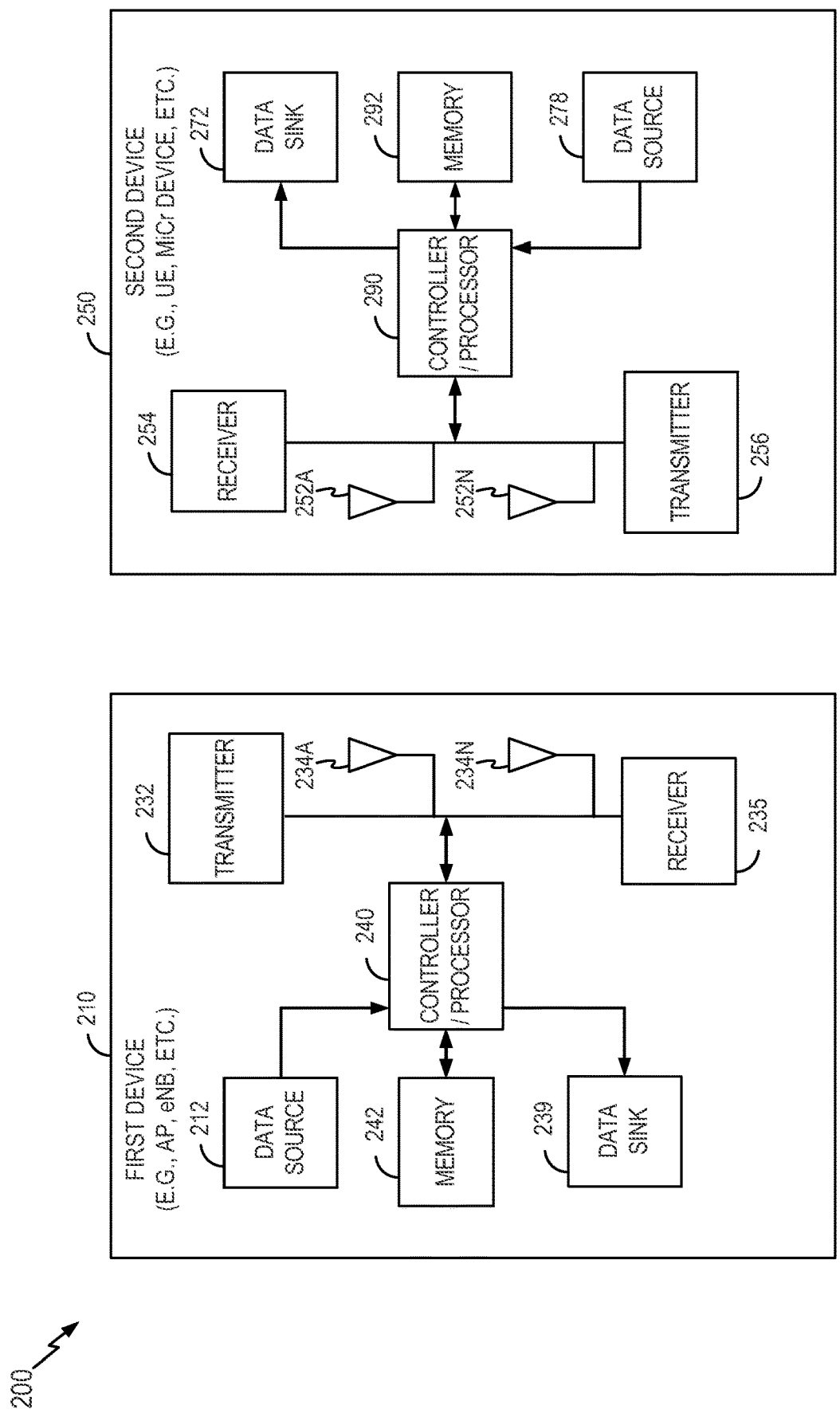
FIG. 2 is a block diagram illustrating an example of a first device in communication with a second device in a communication system according to some aspects of the disclosure.
Figure 3:
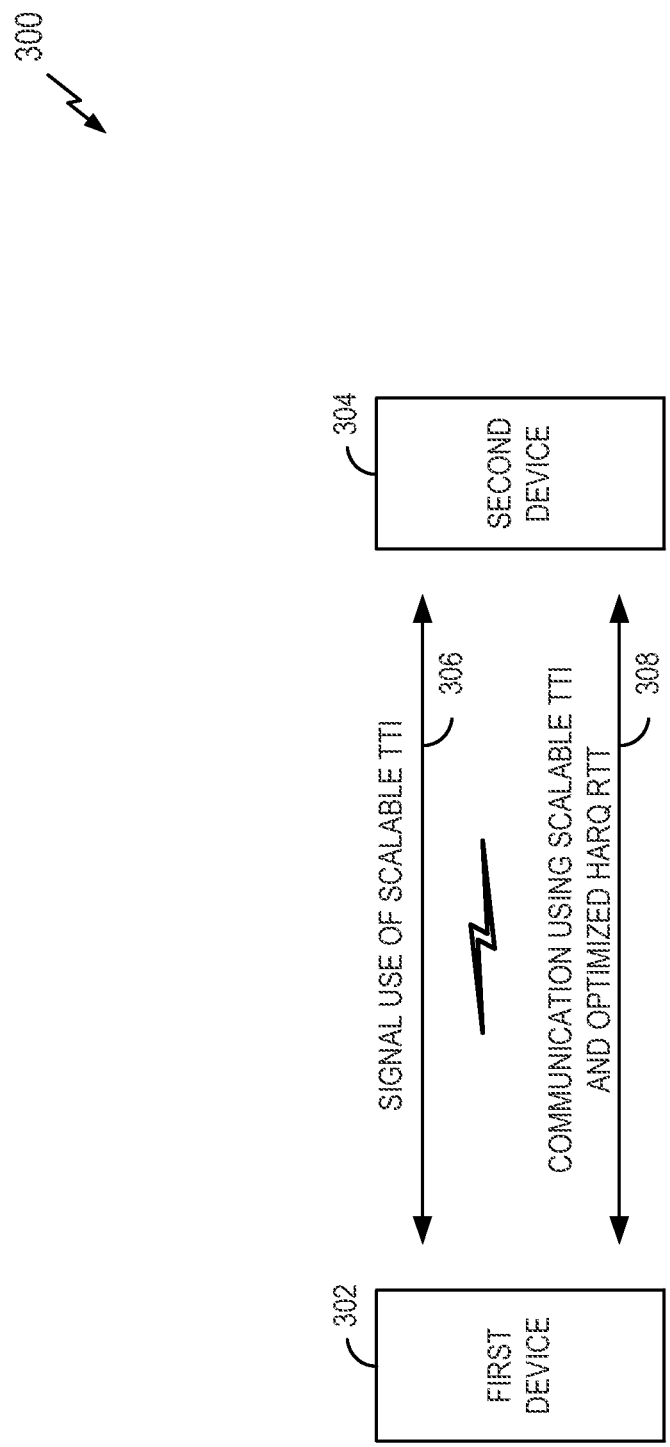
FIG. 3 illustrates examples of signaling use of a scalable TTI in accordance with some aspects of the disclosure.
Figure 13:
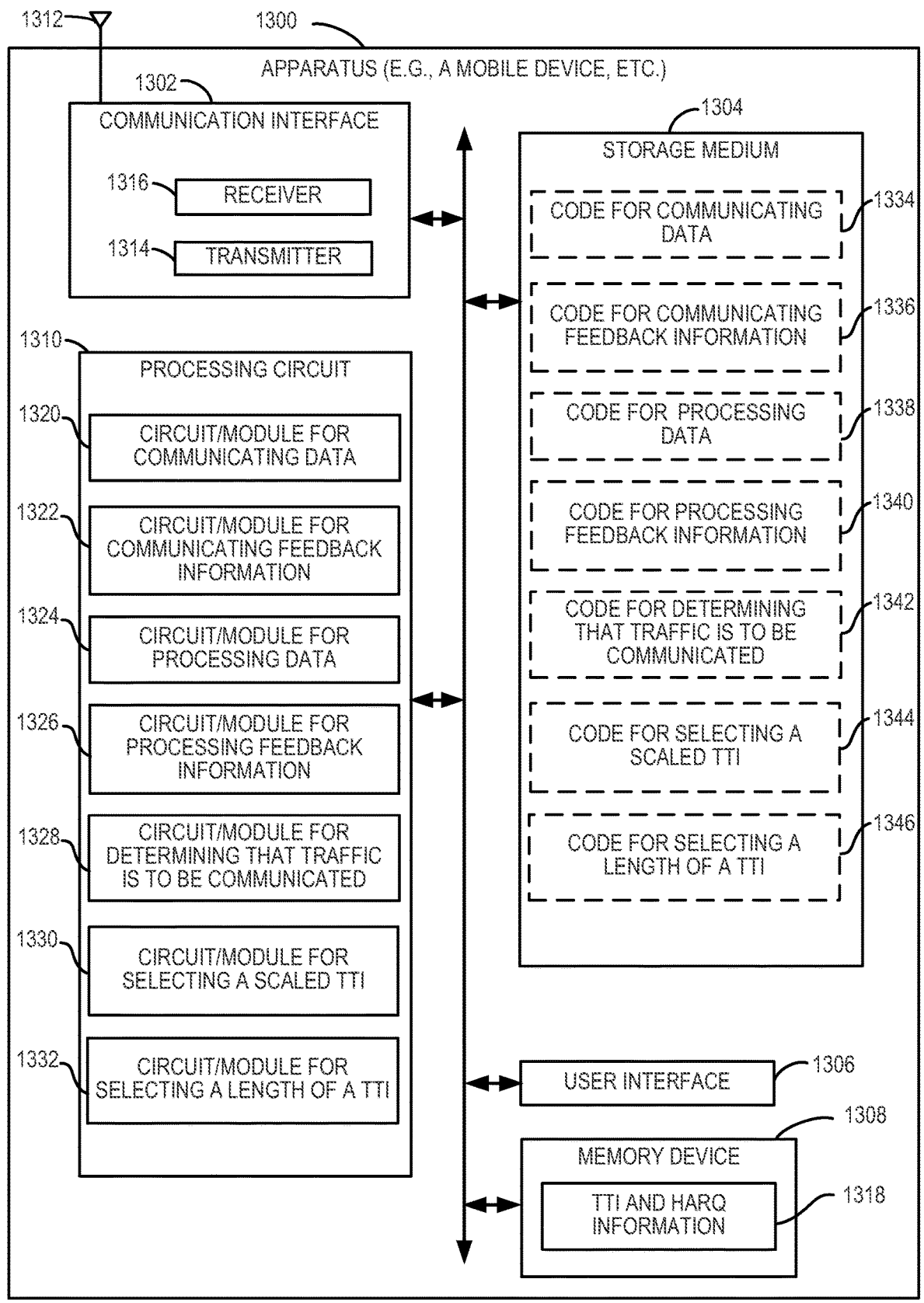
FIG. 13 illustrates a block diagram of an example hardware implementation for an apparatus (e.g., an electronic device) that can support feedback communication in accordance with some aspects of the disclosure.

FIG. 2 is a block diagram of system 200 including a first device 210 in communication with a second device 250, where the first device 210 and the second device 250 may be configured to provide functionality as taught herein. In some implementations, the first device 210 is an access point (AP) and the second device 250 is an AT. For example, the first device 210 may be the AP 142, 144, or 146 in FIG. 1, and the second device 250 may be the AT 130, 132, 134, 136, 138, or 140 in FIG. 1. In some implementations, the first device 210 and the second device 250 are peer devices (e.g., ATs). In some implementations, the second device 250 is a mission critical (MiCr) device. In various operating scenarios, the first device 210 and/or the second device 250 may be a transmitter or transmitting device, or a receiver or receiving device, or both. Examples of such transmitters, transmitting devices, receivers, and receiving devices are illustrated in FIGS. 1, 3, and 13.

In a downlink (DL) communication from the first device 210 to the second device 250, a controller or processor (controller/processor) 240 may receive data from a data source 212. Channel estimates may be used by the controller/processor 240 to determine the coding, modulation, spreading, and/or scrambling schemes for a transmitter 232. These channel estimates may be derived from a reference signal transmitted by the second device 250 or from feedback from the second device 250. The transmitter 232 may provide various signal conditioning functions including amplifying, filtering, and modulating frames onto a carrier for downlink transmission over a wireless medium through antennas 234A-234N. The antennas 234A-234N may include one or more antennas, for example, including beam steering bidirectional adaptive antenna arrays, multiple-input multiple-output (MIMO) arrays, or any other suitable transmission/reception technologies.

At the second device 250, a receiver 254 receives the downlink transmission through antennas 252A-252N (e.g., representing one or more antennas) and processes the transmission to recover the information modulated onto the carrier. The information recovered by the receiver 254 is provided to a controller/processor 290. The controller/processor 290 descrambles and despreads the symbols, and determines the most likely signal constellation points transmitted by the first device 210 based on the modulation scheme. These soft decisions may be based on channel estimates computed by the controller/processor 290. The soft decisions are then decoded and &interleaved to recover the data, control, and reference signals. Cyclic redundancy check (CRC) codes are then checked to determine whether the frames were successfully decoded. The data carried by the successfully decoded frames will then be provided to a data sink 272, which represents applications running in the second device 250 and/or various user interfaces (e.g., display). Control signals carried by successfully decoded frames will be provided to a controller/processor 290. When frames are unsuccessfully decoded, the controller/processor 290 may also use an acknowledgement (ACK) and/or negative acknowledgement (HACK) protocol to support retransmission requests for those frames.

In the uplink from the second device 250 to the first device 210, data from a data source 278 and control signals from the controller/processor 290 are provided. The data source 278 may represent applications running in the second device 250 and various user interfaces (e.g., keyboard). Similar to the functionality described in connection with the downlink transmission by the first device 210, the controller/processor 290 provides various signal processing functions including CRC codes, coding and interleaving to facilitate FEC, mapping to signal constellations, spreading with OVSFs, and scrambling to produce a series of symbols. Channel estimates, derived by the controller/processor 290 from a reference signal transmitted by the first device 210 or from feedback contained in a midamble transmitted by the first device 210, may be used to select the appropriate coding, modulation, spreading, and/or scrambling schemes. The symbols produced by the controller/processor 290 will be utilized to create a frame structure. The controller/processor 290 creates this frame structure by multiplexing the symbols with additional information, resulting in a series of frames. The frames are then provided to a transmitter 256, which provides various signal conditioning functions including amplification, filtering, and modulating the frames onto a carrier for uplink transmission over the wireless medium through the antennas 252A-252N.

The uplink transmission is processed at the first device 210 in a manner similar to that described in connection with the receiver function at the second device 250. A receiver 235 receives the uplink transmission through the antennas 234A-234N and processes the transmission to recover the information modulated onto the carrier. The information recovered by the receiver 235 is provided to the controller/processor 240, which parses each frame. The controller/processor 240 performs the inverse of the processing performed by the controller/processor 290 in the second device 250. The data and control signals carried by the successfully decoded frames may then be provided to a data sink 239. If some of the frames were unsuccessfully decoded, the controller/processor 240 may also use a positive acknowledgement (ACK) and/or negative acknowledgement (NACK) protocol to support retransmission requests for those frames.

The controllers/processors 240 and 290 may be used to direct the operation at the first device 210 and the second device 250, respectively. For example, the controllers/processors 240 and 290 may provide various functions including timing, peripheral interfaces, voltage regulation, power management, and other control functions. The computer readable media of the memories 242 and 292 may store data and software for the first device 210 and the second device 250, respectively.

In accordance with various aspects of the disclosure, an element, or any portion of an element, or any combination of elements may be implemented with the controllers/processors 240 and 290 (e.g., that may each include one or more processors). The controllers/processors 240 and 290 are responsible for general processing, including the execution of software stored in the memory 242 or 292. The software, when executed by the controllers/processors 240 and 290, causes the controllers/processors 240 and 290 to perform the various functions described below for any particular device. The memory 242 or 292 may also be used for storing data that is manipulated by the controllers/processors 240 and 290 when executing software.

In various aspects of the disclosure, a device may be utilized in a wireless communication network, as a scheduling entity (e.g., the first device 210) and/or as a non-scheduling or subordinate entity (e.g., the second device 250). In any case, the device may communicate with one or more wireless entities over an air interface. In any wireless communication network, channel conditions corresponding to the air interface will change over time.

Many networks accordingly use one or more rate control loops to dynamically adapt to the channel. For example, a transmitting device may configure one or more transmission parameters, including but not limited to a modulation and coding scheme (MCS), a transmission power, etc., to target a desired error rate at the receiving device. The receiving device that is receiving a packet-switched data stream typically checks the integrity of packets (e.g., using a cyclic redundancy check or CRC, a checksum, physical layer (PHY) channel coding pass/fail status, etc.) and may report back to the transmitting device using an acknowledgment or non-acknowledgment. This integrity check and reporting frequently, though not always, takes the form of an automatic repeat request (ARQ) and/or hybrid automatic repeat request (HARQ) algorithm. In other examples, any suitable algorithm or means of providing feedback information or response transmissions from the receiving device to the transmitting device may be used, such as reports relating to channel quality.

Scalable TTI and HARQ Optimization

Communication between devices (e,g., between an eNB and different UEs) can involve nominal traffic and mission critical traffic. In some aspects, mission critical traffic may require lower latency and/or higher reliability as compared to nominal traffic. For example, mission critical traffic may be associated with applications where transmitted data needs to be received and decoded successfully at a receiver within a strict deadline (e.g., ultra-low latency). Examples of applications that may employ mission critical traffic include, without limitation, virtual surgeries, automobile traffic control (e.g., traffic grid), and autonomous control over objects (e.g., autonomous automobiles, drone-type air vehicles, and/or other types of autonomous control systems using wireless communication).

In general, mission critical traffic takes precedence over nominal traffic. Thus, to multiplex nominal traffic and mission critical traffic over a given set of wireless communication resources (e.g., frequency resources and/or time resources), nominal traffic may be punctured if needed. That is, the mission critical traffic will take priority over other traffic.

The disclosure relates in some aspects to a scalable TTI and HARQ design. The TTI is scalable to, for example, achieve latency/efficiency tradeoffs for different types of traffic (e.g., mission critical traffic versus traffic with more relaxed latency requirements). In addition, for the case where a longer TTI is employed, various techniques are used to ensure a fast turn-around HARQ and thereby maintain a high level of communication performance.

FIG. 3 illustrates an example of a communication system 300 that supports such a scalable TTI and HARQ design. The communication system 300 includes a first device 302 and a second device 304 that may communicate using different TTI lengths and HARQ processes. In some implementations, the first device 302 is an access point (e.g., an eNB) and the second device 304 is an access terminal (e.g., a UE). In some implementations, the first device 302 and the second device 304 are peer devices. At some point in time (e.g., when the first device 302 and the second device 304 initially associate with each other), the first device 302 and the second device 304 signal support 306 for use of a scalable TTI. For example, the first device 302 may send a message to the second device 304 where the message indicates that the first device 302 will use a multi-symbol thin TTI for an upcoming traffic flow. Consequently, the first device 302 and the second device 304 may use an HARQ RTT that is optimized for the multi-symbol thin TTI during subsequent communication 308.

The disclosure relates in some aspects to a multi-symbol TTI design with an optimized HARQ RTT to improve communication latency, efficiency, and reliability. For example, a single symbol TTI may be used for mission critical traffic. For traffic with more relaxed latency requirements, a multi-symbol TTI may be employed. In addition, to facilitate a fast HARQ RTT when a multi-symbol TTI is employed, data processing, pilot transmission, and acknowledgement transmission may be performed shortly after and/or during the receipt of the multi-symbol TTI.

The disclosure relates in some aspects to a multi-symbol TTI design with optimized HARQ RTT. In some aspects, this design may provide at least one of improved latency, efficiency, or reliability as compared to other scalable TTI designs.

The disclosure relates in some aspects to a multi-symbol TTI design for mission critical (MiCr) traffic. The design includes a scalable TTI and optimized HARQ design. A scalable TTI can be used to provide a latency/efficiency tradeoff In addition, a fast turn-around HARQ may be employed to maintain a high level of communication performance.

The design may include one or more of the following features, in some aspects, pilot and control overhead amortization can be achieved through the use of a multi-symbol TTI. In some aspects, a reduction in a HARQ RTT timeline can be achieved (e.g., as compared to other scalable TTI designs) through the use of a multi-symbol TTI design and a highly optimized control/ACK timeline (e.g., early pilot and ACK/NACK scheduling). In some aspects, uplink (UL) TTI improvement (e.g., a higher link-budget) may be achieved through the use of HARQ RTT optimization based on a multi-symbol TTI, in some aspects, early scheduling of an UL pilot may be employed in a multi-symbol TTI framework. In some aspects, early scheduling of UL-channel state feedback (CSF) may be employed in a multi-symbol TTI framework. In some aspects, TTI alignment is provided between multi-symbol low-latency TTIs and nominal TTIs to facilitate low-latency traffic/puncturing monitoring and interference management. Here, by keeping TTIs aligned (e.g., synchronous at multi-symbol boundaries), the duty cycle at which nominal and low latency (e.g., MiCr) traffic need to monitor the low latency traffic may be reduced. In some aspects, further RTT timeline reduction can be achieved through the use of timing advance (TA) techniques and/or CSF-based techniques.

Several example aspects of the disclosure will be described with reference to FIGS. 4-12. It should be appreciated, that the teachings herein may employ various types of devices and be implemented using various types of radio technologies and architectures. Also, various operations may be described as being performed by specific types of components (e.g., eNBs, base stations, client devices, peer-to-peer devices, MiCr devices, UEs, and so on). It should be understood that these operations can be performed by other types of devices. To reduce the complexity of these figures, only few example components are shown. However, the teachings herein can be implemented using a different number of components or other types of components.

Figure 4:
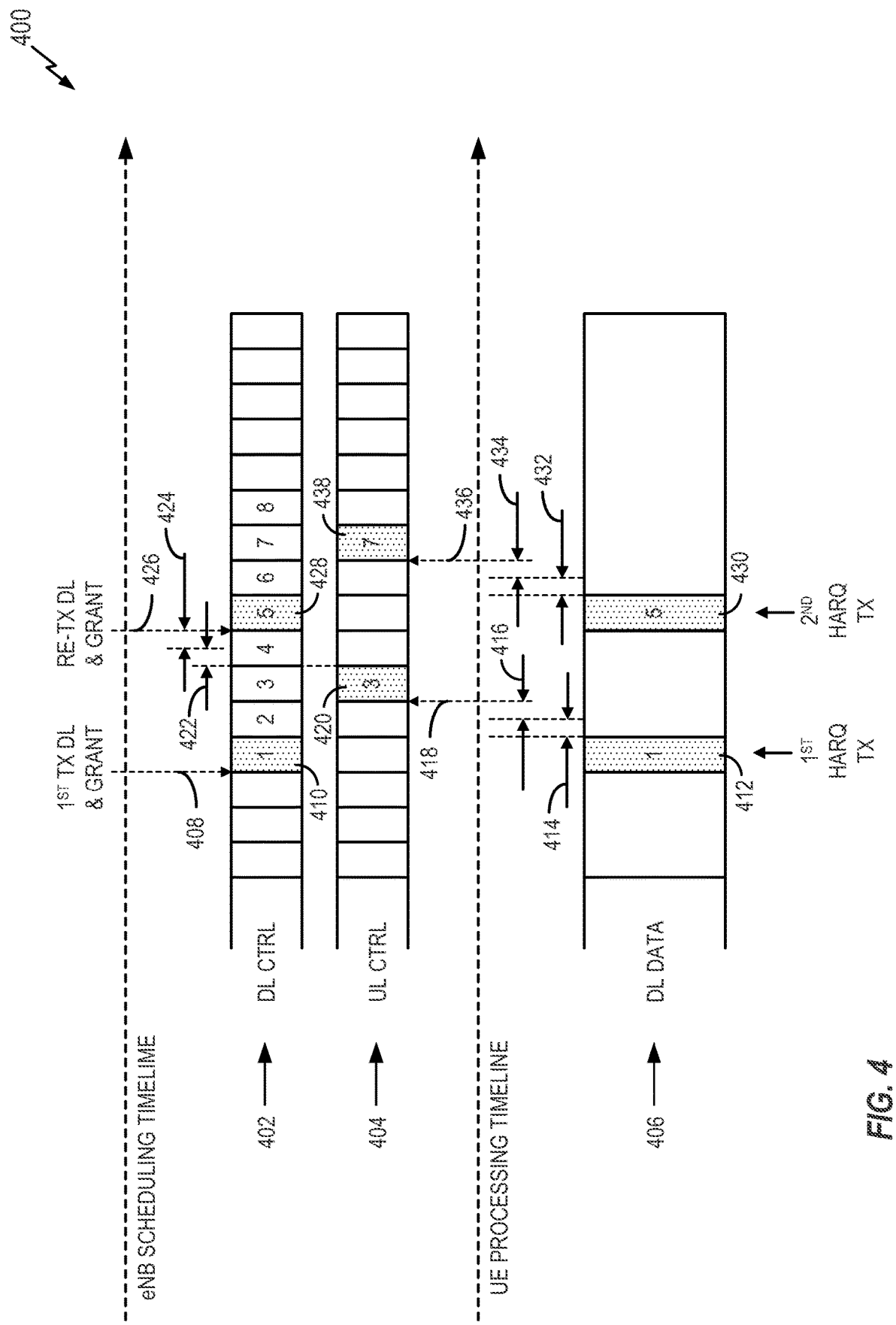
FIG. 4 illustrates an example of an HARQ timeline.

For purposes of introduction, FIG. 4 illustrates an example of a MiCr single symbol TTI DT HARQ timeline 400. The MiCr DL HARQ timeline 400 illustrates eNB scheduling and UE processing. In the MiCr DL HARQ timeline 400, a physical layer (PHY) TTI is one symbol in length having a period of 31.25 microseconds (us) or some other suitable period). A single symbol TTI is used to achieve very low latency. For an example of an application layer with a RTT of 1 millisecond (ms), a HARQ RTT of 125 μs may be employed in some scenarios. Accordingly, the HARQ RTT of FIG. 4 is shown as including four symbols (e.g., 125 μs). In some scenarios, the worst case latency for this example is six symbols (e.g., 187.5 μs).

FIG. 4 illustrates TTIs for downlink control (DL CTRL) 402, uplink control (UL CTRL) 404, and DL data 406. The following describes two HARQ transmissions.

During a first symbol period 1, an eNB transmits data 408 to a UE via the DL. Thus, the eNB may transmit DL data and a grant as indicated by a symbol 410 and this data is received at the UE as indicated by a symbol 412. After a propagation delay 414 and a period of time 416 for UE DL decoding and UL ACK/NACK preparation, the UE sends 418 a first ACK or NACK to the eNB during a third symbol period 3. This UL control information is received at the eNB as indicated by a symbol 420.

After a propagation delay 422 and a period of time 424 for eNB ACK/NACK decoding and DL re-transmission preparation, the eNB may send 426 a retransmission to the UE during a fifth symbol period 5. Thus, the eNB may retransmit the DL data and the grant as indicated by a symbol 428 and this data is received at the UE as indicated by a symbol 430. After a propagation delay 432 and a period of time 434 for UE DL decoding and UL ACK/NACK preparation, the UE sends 436 a second ACK or NACK to the eNB during a seventh symbol period 7. This UL control information is received at the eNB as indicated by a symbol 438.

The disclosure relates in some aspects to scaling up a TTI under different latency requirements in a manner that improves communication reliability and spectrum efficiency. For example, some use cases require high reliability, but have a relaxed timeline (in term of a latency requirement). As a specific example, the TTI may be scaled up to accommodate a switch from a 2-way application layer latency of 1 ms to a 1-way application layer latency of 1 ms.

Scaling up the TTI (e.g., when switching between mission critical traffic and nominal traffic or traffic with a less critical latency requirement) may be done linearly or the number of symbols in the TTI may be changed. The disclosure relates in some aspects to scaling up the TTI to improve link budget, reliability, or spectrum use (when using multiple symbols per TTI. As discussed below, it may be advantageous to not scale up everything (e.g. HARQ) linearly.

Figure 5:
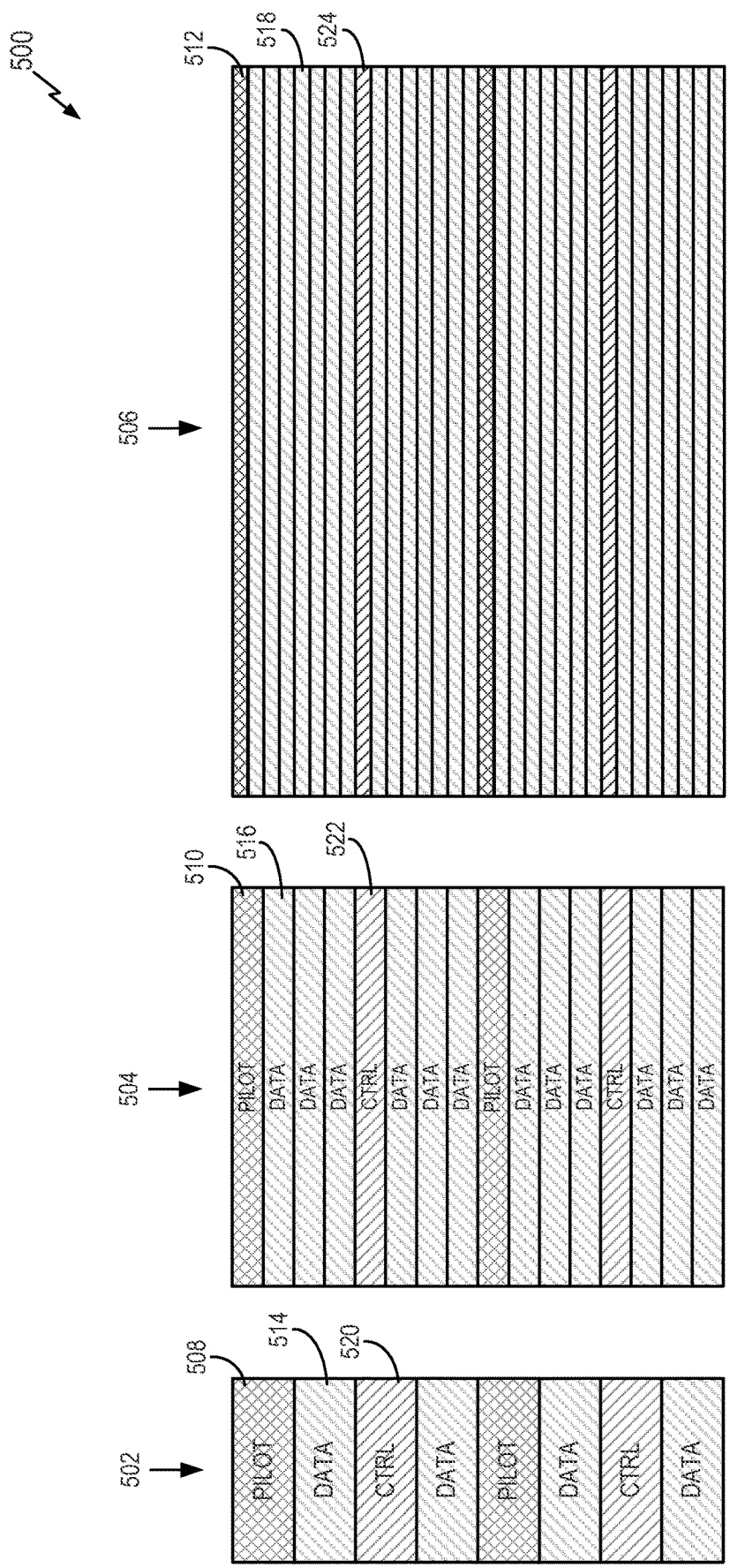
FIG. 5 illustrates an example of TTI scaling in accordance with some aspects of the disclosure.
Figure 6:
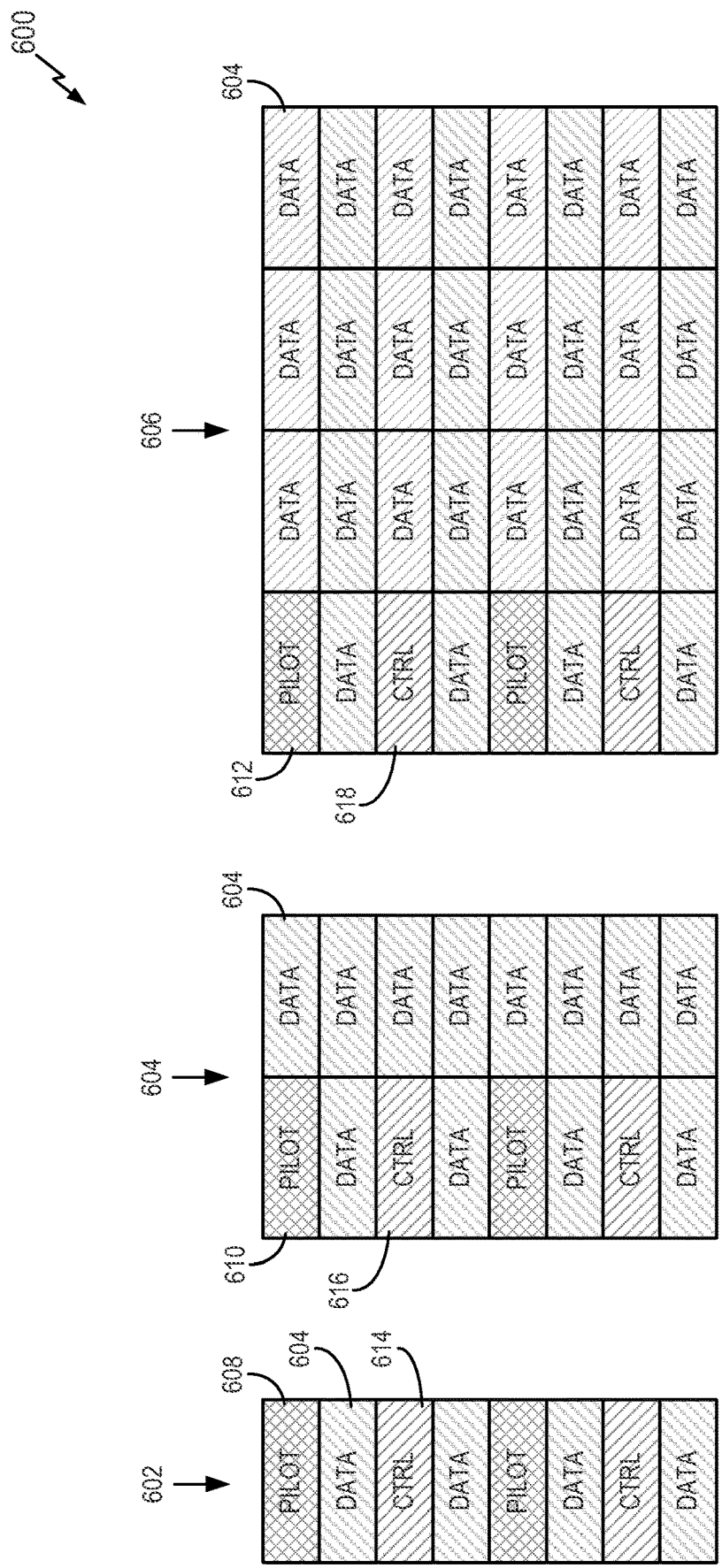
FIG. 6 illustrates another example of TTI scaling in accordance with some aspects of the disclosure.

FIG. 5 illustrates a linear scaling approach 500 (i.e., a TTI is scaled in its entirety) and FIG. 6 illustrates a non-linear scaling approach 600 (i.e., the HARQ RTT is not linearly scaled). The pilot/control overhead is amortized over time by the same amount in both cases.

In the linear scaling approach 500 of FIG. 5, one thin-symbol 502 (e.g., a symbol as employed in FIG. 4) is mapped to one wide-symbol 504 or one wider-symbol 506. As indicated, the pilot 508 of the thin-symbol 502 is spread throughout the wide-symbol 504 and the wider-symbol 506 as indicated by the pilot 510 and the pilot 512, respectively. Similarly, the data 514 of the thin-symbol 502 is spread throughout the wide-symbol 504 and the wider-symbol 506 as indicated by the data 516 and the data 518, respectively. Also, the control information (CTRL) 520 of the thin-symbol 502 is spread throughout the wide-symbol 504 and the wider-symbol 506 as indicated by the CTRL 522 and the CTRL 524, respectively. Accordingly, pilot and/or control processing may have relatively high latency (the entire symbol period). Also, the wide-symbol 504 and the wider-symbol 506 may have a relatively long cyclic prefix (CP).

In the non-linear scaling approach 600 of FIG. 6, one thin-symbol 602 (e.g., the same symbol as the thin-symbol 502) is mapped to a first multi-thin-symbol 604 or a second multi-thin-symbol 606. In this case, the pilot and/or control processing is front-loaded. For example, the pilot 608 of the thin-symbol 602 is mapped to the beginning of the first multi-thin-symbol 604 or the second multi-thin-symbol 606 as indicated by the pilot 610 and the pilot 612, respectively. Similarly, the control information (CTRL) 614 of the thin-symbol 602 is mapped to the beginning of the first multi-thin-symbol 604 or the second multi-thin-symbol 606 as indicated by the CTRL 616 and the CTRL 618, respectively. As a result, this pilot and/or control processing in the non-linear scaling approach 600 may have lower processing latency than in the linear scaling approach 500. Also, a multi-thin-symbol in the non-linear scaling approach 600 may have a relatively short CP as compared to the linear scaling approach 500.

Figure 7:
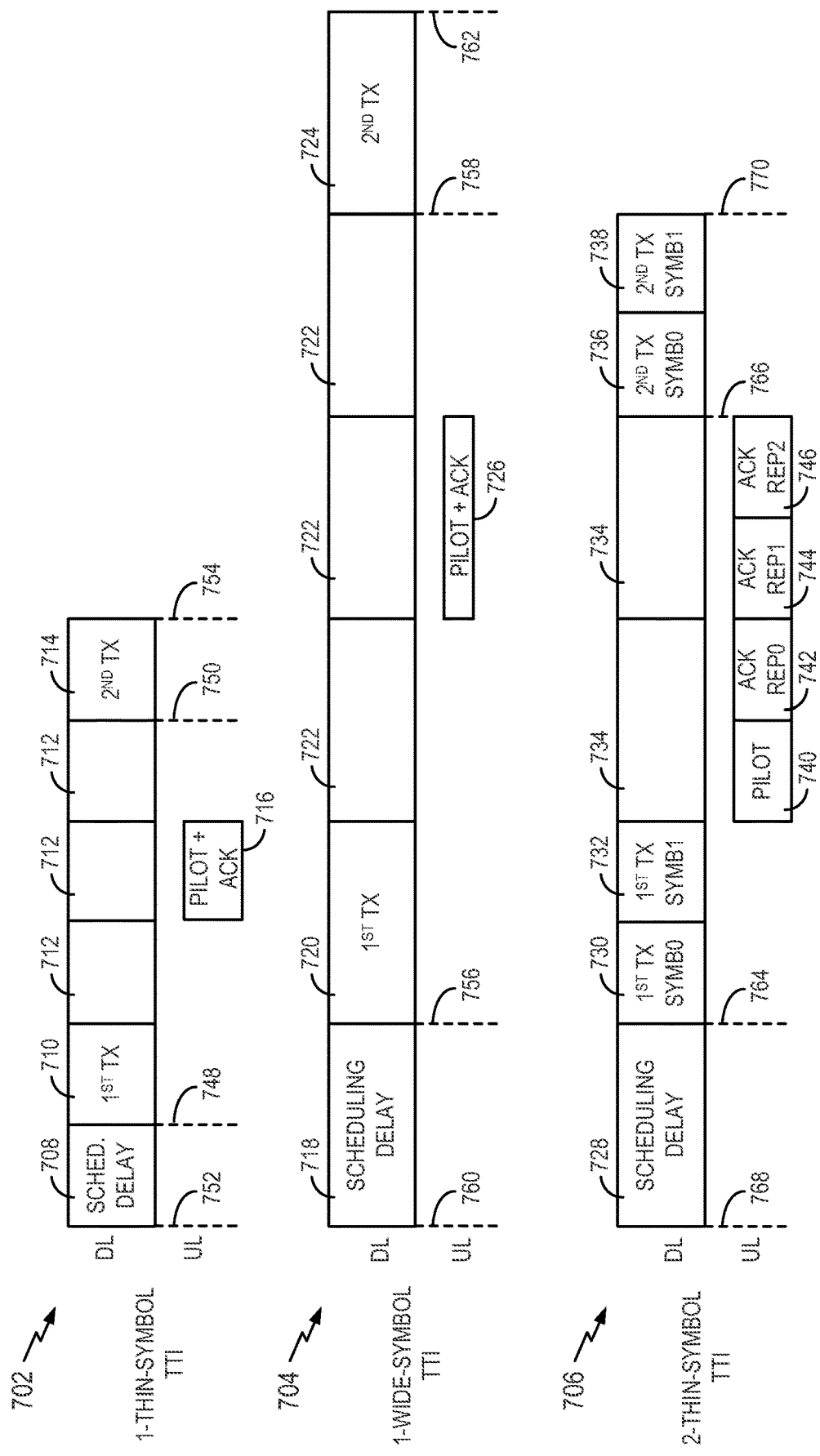
FIG. 7 illustrates a comparison of different TTI designs in accordance with some aspects of the disclosure.

FIG. 7 illustrates timing comparisons between an example of a 1-thin-symbol TTI scenario 702 (e.g., illustrated in FIG. 4), an example of a 1-wide-symbol TTI scenario 704 (e.g., the linear scaling approach 500 of FIG. 5), and an example of a 2-thin-symbol TTI scenario 706 (e.g., the non-linear scaling approach 600 of FIG. 6). In each scenario, there are TTI gaps for processing between a DL transmission during a first transmission (1st TX) and a DL transmission during a second transmission (2nd TX).

The 1-thin-symbol TTI scenario 702 includes a first TTI for a scheduling delay 708, a second TTI for a 1st TX 710, third through fifth TTIs 712 (TTI gaps), and a sixth TTI for a 2nd TX 714. In the uplink, pilot and acknowledgement (e.g., ACK) signals 716 are sent two TTIs after the 1st TX 710.

The 1-wide-symbol TTI scenario 704 includes a first TTI for a scheduling delay 718, a second TTI for a $1^{st}$ TX 720, third through fifth TTIs 722 (TTI gaps), and a sixth TTI for a $2^{nd}$ TX 724. In the uplink, pilot and acknowledgement (e.g., ACK) signals 726 are sent two TTIs after the 1st TX 720.

The 2-thin-symbol TTI scenario 706 includes a first TTI for a scheduling delay 728, a second TTI for a first symbol (SYMB0) 730 and a second symbol (SYMB1) 732 for a $1^{st}$ TX, third and fourth TTIs 734 (TTI gaps), and a fifth TTI for a first symbol (SYMB0) 736 and a second symbol (SYMB1) 738 for a $2^{nd}$ TX. Pilot and control information may be upfront loaded in the first symbol (e.g., the SYMB0 730). In the uplink, pilot signals (which may be simply referred to as a pilot) 740 and acknowledgement signals (ACK REP0 742, ACK REP1 744, and ACK REP2 746) are sent in the TTI immediately following the second TTI that includes the SYMB0 730 and the SYMB1 732.

Thus, for the 2-thin-symbol TTI scenario 706, the Control/ACK. TTI provides a fast HARQ turn-around. For example, processing of the SYMB0 730 may be performed during the SYMB1 732 time period, thereby enabling the ACK to be generated sooner. Moreover, the ACK signal includes a front-loaded pilot 740, thereby enabling the ACK to be processed sooner. A comparison of the timing for each of the scenarios of FIG. 7 follows.

In the 1-thin-symbol TTI scenario 702, the DL 1 RTT=4 thin symbols and the UL ACK Channel=1 thin symbol. Assuming a TTI period of 31.25 μs, the 4-symbol RTT from a beginning 748 of the $1^{st}$ TX 710 to a beginning 750 of the $2^{nd}$ TX 714 is 125 μs. In addition, the worst case 6-symbol end-to-end delay, which takes into account the scheduling delay and completing the failed 1st transmission and the 2nd transmission, from a beginning 752 of the scheduling delay 708 to an end 754 of the $2^{nd}$ TX 714 is 187.5 μs. It should be appreciated that different implementations and/or traffic scenarios may use different TTI periods.

In the 1-wide-symbol TTI scenario 704, the DL 1 RTT=8 thin symbols and the UL ACK Channel=2 thin symbols. Here, a "thin symbol" corresponds to the symbol period of the 1-thin-symbol TTI scenario 702. Assuming a TTI period of 62.5 μs, the 8-symbol RTT from a beginning 756 of the $1^{st}$ TX 720 to a beginning 758 of the $2^{nd}$ TX 724 is 250 μs. In addition, the worst case 12-symbol end-to-end latency, which takes into account the scheduling delay and completing the failed 1st transmission and the 2nd transmission, from a beginning 760 of the scheduling delay 718 to an end 762 of the $2^{nd}$ TX 724 is 375 μs. It should be appreciated that different implementations and/or traffic scenarios may use different TTI periods.

In contrast, in the 2-thin-symbol TTI scenario 706, the DL 1 RTT=6 thin symbols and the UL ACK Channel=3 thin symbols. Assuming a TTI period of 62.5 μs, the 6-symbol RTT from a beginning 764 of the SYMB0 730 to a beginning 766 of the SYMB0 736 is 187.5 μs. The worst case 10-symbol end-to-end latency from a beginning 768 of the scheduling delay 728 to an end 770 of the SYMB1 738 is 312.5 μs, In some scenarios, ACK REP2 might not be sent since the eNB might not have sufficient time to process the ACK REP2 746 before the second transmission. It should be appreciated that different implementations and/or traffic scenarios may use different TTI periods.

Comparison of the 1-wide-symbol TTI scenario 704 and the 2-thin-symbol TTI scenario 706 indicates that the 2-thinsymbol TTI scenario 706 is more advantageous in some aspects. For example, for the DL, there is a 25% latency reduction per RTT in the 2-thin-symbol TTI scenario 706 as compared to the 1-wide symbol TTI scenario 704. For the UL, there is a greater than 50% TTI duration gain (e.g., power gain) in the 2-thin-symbol TTI scenario 706 as compared to the 1-wide-symbol TTI scenario 704. This power gain (or link budget gain) is due to the longer time period available for sending the pilot and ACK/NACK. Moreover, as indicated in FIG. 7, the longer time period available for sending the pilot and ACK/NACK enables a receiving device (e.g., a 111E) to send multiple ACKs/NACKs on the UL (e.g., ACK REP0 742 and ACK REP1 744), thereby potentially improving communication performance.

Summarizing the above, by employing two symbols in each TTI and having the pilot and control upfront loaded in the first symbol (e.g., the SYMB0 730); even before data is decoded, a receiving device could decode the pilot and control in the first symbol (e.g., the SYMB0 730). That is, the receiving device could process the pilot and control before the corresponding TTI is completed. For example, in the second symbol (e.g., the SYMB1 732), the receiving device could process the pilot and control and thereby determine that there is data for that device in this particular TTI. This provides some processing timing advantages in the pilot and control processing.

Thus, for the corresponding UL, the receiving device can start to schedule higher layers sooner (e.g., in the TTI immediately following the 1st TX TTI as shown in FIG. 7) than could be done in the 1-wide-symbol TTI scenario 704. Also, the pilot can be scheduled earlier. In contrast, in the 1-wide-symbol TTI scenario 704, with the pilot and control in one TTI symbol, some time is needed to process this information before the UL can be scheduled.

Reiterating, in the 2-thin-symbol TTI scenario 706, a device (e.g., a UE) that receives on the DL during SYMB0 730 can start processing received signals during SYMB1 732. Since each TTI has multiple symbols, in the TTI immediately following the 1st TX TTI, upon reaching the second part of the TTI, the whole TTI of the DL could already be decoded. Thus, in the TTI immediately following the 1st TX TTI, an UL ACK (e.g., ACK REP0 742) can be sent. The pilot 740 for the LT ACK is front-loaded as well. Accordingly, the whole timeline has been tightened and compressed as compared to the 1-wide-symbol TTI scenario 704.

Moreover, there is an increase in UL TTI duration. Consequently, the ACK can be repeated in the next TTI as shown in FIG. 7.

Figure 8:
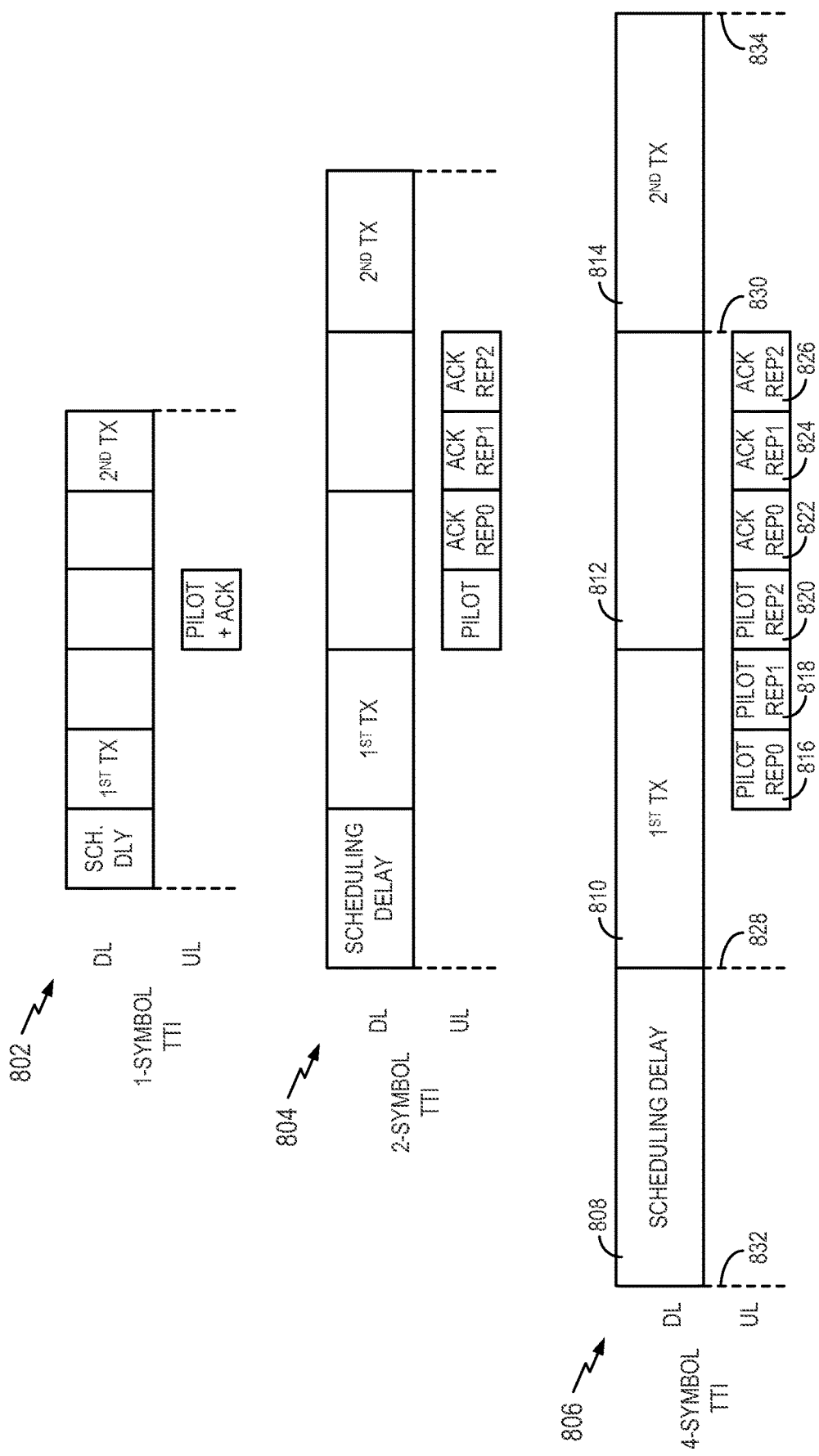
FIG. 8 illustrates examples of thin TTIs with multiple symbols in accordance with some aspects of the disclosure.

The teachings herein may be employed in conjunction with different TTI scaling factors (e.g., 2, 4, etc.). FIG. 8 illustrates timing comparisons between an example of a 1-thin-symbol TTI scenario 802 (e.g., the 1-thin-symbol TTI scenario 702 of FIG. 7), an example of a 2-thin-symbol TTI scenario 804 (e.g., the 2-thin-symbol TTI scenario 706 of FIG. 7), and an example of a 4-thin-symbol TTI scenario 806.

The 4-thin-symbol TTI scenario 806 includes a first TTI for a scheduling delay 808, a second TTI for a 1$^{st}$ TX 810, third TTI for a gap 812, and a fourth TTI for a 2$^{nd}$ TX 814. Multiple copies of pilot signals (PILOT REP0 816, PILOT REP1 818, and PILOT REP2 820) and acknowledgement signals (ACK REP0 822, ACK REP1 824, and ACK REP2 826) are sent on the UL in this example.

As shown in FIG. 8, the 4-thin-symbol TTI scenario 806 provides an even thster HARQ turn-around. For example, processing of the 1$^{st}$ TX 810 may be performed, at least in part, during the 1$^{st}$ TX 810, thereby enabling the ACK to be generated sooner. A comparison of the timing for the 2-thin-symbol TTI scenario 804 and the 4-thin-symbol TTI scenario 806 follows.

As discussed above in conjunction with FIG. 6, the 2-thin-symbol TTI scenario 804 has a RTT=3 TTIs, with a worst case end-to-end (E2E) latency of 5 TTIs. Thus, with a TTI period of 62.5 µs, the RTT is 187.5 µs and the worst case end-to-end latency is 312.5 µs.

In the 4-thin-symbol TTI scenario 806, 1 RTT=2 TTIs, with a worst case end-to-end (E2E) latency of 4 TTIs. Assuming a TTI period of 125 µs, the 2-TTI RTT from a beginning 828 of the 1$^{st}$ TX 810 to a beginning 830 of the 2$^{nd}$ TX 814 is 250 µs. The worst case 4-TTI end-to-end latency from a beginning 832 of the scheduling delay 808 to an end 834 of the 2$^{nd}$ TX 814 is 500 µs. It should be appreciated that different implementations and/OT traffic scenarios may use different TTI periods.

As indicated in FIG. 8, early pilot and/or control processing is employed to enable early LT pilot pre-scheduling (before data gets decoded). For example, in the 4-thin-symbol TTI scenario 806, a receiving device may process received data during the 1st TX 810 to quickly generate the ACK. Also, pilots may be sent during the 1st TX 810 in the 4-thin-symbol TTI scenario 806 thereby enabling the device that transmitted the data to more quickly decode feedback from the receiving device.

In addition, as shown for the 4-thin-symbol TTI scenario 806, the period of the data TTI may be matched to the processing and ACK time interval. Accordingly, the gap for processing between transmissions may be a single TTI as shown.

Table 1 illustrates example comparisons between multi-symbol TTI performance and single-symbol TTI performance.

TABLE 1

| | Examples | | | | |
|---|---|---|---|---|---|
| | 1-thin-symbol TTI | 2-thin-symbol TTI | 1-wide-symbol TTI | 4-thin-symbol TTI | 1-wider-symbol TTI |
| Number of Symbols per TTI | 1 | 2 | 1 | 4 | 1 |
| Subcarrier Spacing (kHz) | 36 | 36 | 18 | 36 | 9 |
| TTI Duration (µs) | 31.25 | 62.50 | 62.50 | 125.00 | 125.00 |
| HARQ RTT (µs) | 125.00 | 187.50 | 250.00 | 250.00 | 500.00 |
| Pilot/Control Overhead | 0.250 | 0.125 | 0.125 | 0.063 | 0.063 |
| UL ACK Duration (µs) | 31.25 | 93.75 | 62.50 | 156.25 | 125.00 |
| CP Duration (µs) | 3.47 | 3.47 | 6.94 | 3.47 | 13.89 |
| Number of MiCr TTIs per ms Unit | 32 | 16 | 16 | 8 | 8 |

Advantages of a multi-thin-symbol TTI over a 1-thin-symbol TTI can include one or more of the following. The control/ACK period may be matched to the data TTI period: sub-linear RTT is increased from 4-symbols (e.g., 125 µs) to 8-symbol (e.g., 250 µs). There may be a reduction in pilot overhead and/or control overhead. For example, from a 1-thin-symbol TTI to a 4-thin-symbol TTI, the overhead may change from 25% to 6%. There may be a gain in UL feedback TTI. For example, from a 1-thin-symbol TTI to a 4-thin-symbol TTI, the UL transmission time may increase from 1-thin-symbol to 5-thin-symbols (see FIG. 8). For MiCr traffic monitoring and/or MiCr interference monitoring, there may be a reduction in the monitoring frequency (interval). For example, from a 1-thin-symbol TTI to a 4-thin-symbol TTI, the periodicity of MiCr traffic monitoring (once per TTI) may change from 32 times per ms to 8 times per ms.

Advantages of a multi-thin-symbol TTI over a 1-wide-symbol TTI (from FIG. 7) can include one or more of the following. There may be a reduction in RTT (with the same TTI) due to the use of a thin control and/or ACK. There may be UL Control channel capacity gain and/or power gain due to the amortization of the pilot and control over a longer time period.

Figure 9:
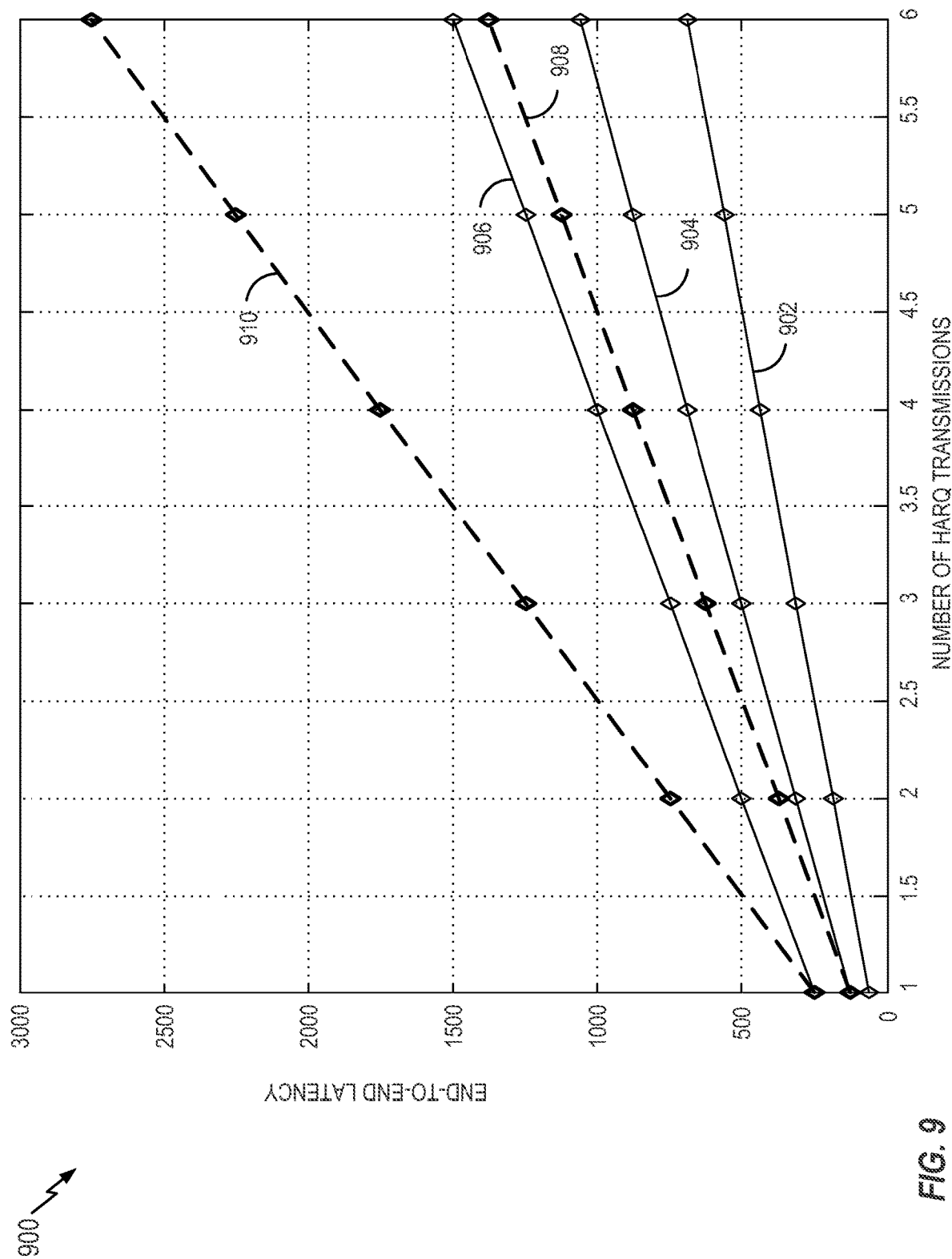
FIG. 9 illustrates an example comparison of latency versus number of HARQ transmissions in accordance with some aspects of the disclosure.

FIG. 9 depicts a graph 900 of multi-thin-symbol TTI E2E latency versus the number of HARQ transmissions. A first curve 902 corresponds to a 1-thin-symbol TTI. A second curve 904 corresponds to a 2-thin-symbol TTI. A third curve 906 corresponds to a 4-thin-symbol TTI. A fourth curve 908 corresponds to a 1-wide-symbol TTI. A fifth curve 910 corresponds to a 1-wider-symbol TTI (e.g., twice the width of the 1-wide-symbol TTI).

For a single-symbol, the RTT=4 TTIs, and the scheduling+last TTI=2 TTIs. The latency=4(num_HARQ_Tx−1) TTI=2 TTIs.

For the two-thin-symbol, the RTT=3 TTIs, and the scheduling+last TTI=2 TTIs. The latency=3(num_HARQ_Tx−1) TTI+2 TTIs.

For the 4-thin-symbol, the RTT=2 TTIs, and the scheduling+last TTI=2 TTIs. The latency 2(num_HARQ_Tx−1) TTI+1+2 TTIs.

Thus, the multi-symbol RTT=2 or 3 TTIs instead of 4 TTIs. Accordingly, the use of the multi-thin-symbol is more efficient with a larger number of HARQ transmissions. As shown in FIG. 9, the multi-thin-symbol TTI has a better slope than the wide symbol TTIs.

Figure 10:
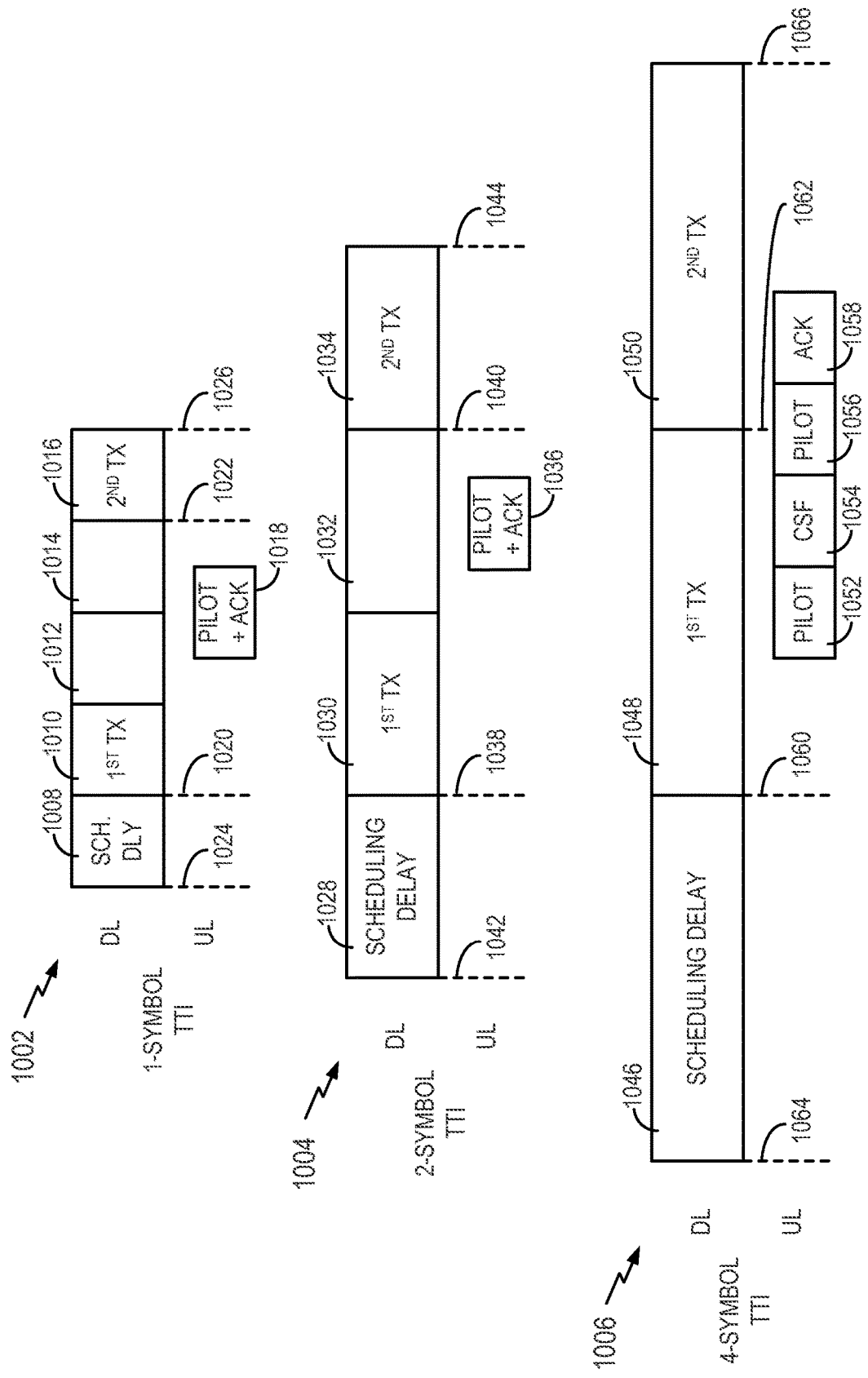
FIG. 10 illustrates examples of tightened TTI timelines in accordance with some aspects of the disclosure.
Figure 11:
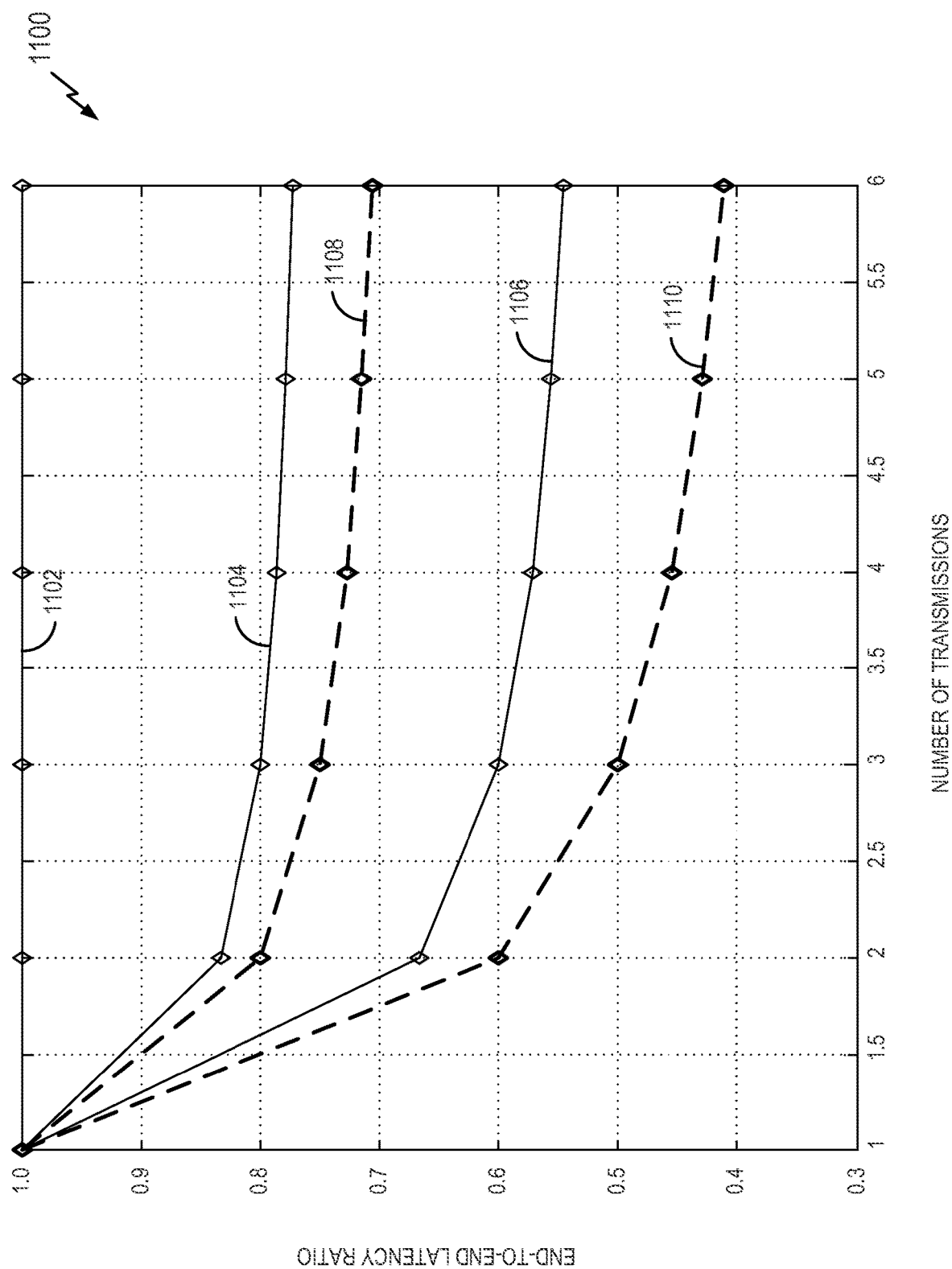
FIG. 11 illustrates an example comparison of latency ratio versus number of transmissions in accordance with sonic aspects of the disclosure.

Referring now to FIGS. 10 and 11, further shortening (tightening) of the TTI may be possible through the use of timing advance and/or channel state feedback (CSF).

FIG. 10 illustrates examples of scalable multi-thin-symbol TTI timelines. A 1-thin-symbol TTI scenario 1002 employs tightening through the use of timing advance, a 2-thin-symbol TTI scenario 1004 employs tightening through the use of timing advance, and a 4-thin-symbol TI scenario 1006 employs tightening through the use of channel state feedback (CSF).

As indicated for the 1-thin-symbol TTI scenario 1002 and the 2-thin-symbol TTI scenario 1004, the pilot and ACK channel RTT is tightened by advancing the timing of the transmission of the pilot and ACK. In some implementations, the pilot and ACK may be sent during the same symbol period (e.g., via different frequency bands). In some implementations (e.g., that employ non-coherent receivers), a pilot might not be employed here.

The 1-thin-symbol TTI scenario 1002 includes a first TTI for a scheduling delay 1008, a second TTI for a $1^{st}$ TX 1010, a third TTI for a first gap 1012, a fourth TTI for a second gap 1014, and a fifth TTI for a $2^{nd}$ TX 1016. Thus, the 1-thin-symbol TTI scenario 1002 uses two gap processing periods as compared to the three processing gap periods used in the 1-thin-symbol TTI scenario 802 of FIG. 8.

In addition, the pilot and ACK 1018 is advanced in time (commencing during the first gap 1012) as compared 1-thin-symbol TTI scenario 802 of FIG. 8 (where the pilot and ACK commence during the second gap). Also, relatively small gaps are provided on each side of the pilot and ACK 1018 for DL and UL, processing.

For the 1-thin-symbol TTI scenario 1002, TTI=3 TTI, with a worst case E2E latency=5 symbols. Thus, assuming a TTI period of 31.25 μs, the 3-symbol RTT from a beginning 1020 of the $1^{st}$ TX 1010 to a beginning 1022 of the $2^{nd}$ TX 1016 is 93.75 us. In addition, a worst case 5-symbol end-to-end latency from a beginning 1024 of the scheduling delay 1008 to an end 1026 of the $2^{nd}$ TX 1016 is 156.25 μs. Different implementations and/or traffic scenarios may use different TTI periods.

The 2-thin-symbol TTI scenario 1004 includes a first TTI for a scheduling delay 1028, a second TTI for a $1^{st}$ TX 1030, a third TTI for a gap 1032, and a fourth TTI for a $2^{nd}$ TX 1034. Thus, the 2-thin-symbol TTI scenario 1004 uses one gap processing period as compared to the two processing gap periods used in the 2-thin-symbol TTI scenario 804 of FIG. 8. Relatively small gaps are provided on each side of the pilot and ACK 1036 for DL and UL processing.

For a 2-thin-symbol TTI scenario 1004, 1 RTT=2 TTIs, with a worst case E2E latency=8 symbols. Thus, assuming a TTI period of 62.5 μs, the 4-symbol RTT from a beginning 1038 of the $1^{st}$ TX 1030 to a beginning 1040 of the $2^{nd}$ TX 1034 is 125 μs. In addition, a worst case 8-symbol end-to-end latency from a beginning 1042 of the scheduling delay 1028 to an end 1044 of the $2^{nd}$ TX 1034 is 250 μs. Different implementations and/or traffic scenarios may use different TTI periods.

The 4-thin-symbol TTI scenario 1006 includes a first TTI for a scheduling delay 1046, a second TTI for a $1^{st}$ TX 1048, and a third TTI for a $2^{nd}$ TX 1050. Here, it may be seen that the retransmission may immediately follow the first transmission in contrast with the 4-thin-symbol TTI scenario 806 of FIG. 8 that employs a gap 812.

In addition, the UL feedback (e.g., the pilot 1052, the CSF 1054, the pilot 1056, and the ACK 1058) is advanced in time as compared to the 4-thin-symbol TTI scenario 806 of FIG. 8. For example, the pilot 1052 commences during the first half of the $1^{st}$ TX 1048 in FIG. 10, while the pilot REP0 816 commences at the middle of the $1^{st}$ TX 810 in FIG. 8.

For the 4-thin-symbol TTI scenario 1006, 1 RTT=1 TTI, with a worst case E2E latency=12 symbols. Assuming a TTI period of 125 μs, the 4-symbol RTT from a beginning 1060 of the $1^{st}$ TX 1048 to a beginning 1062 of the $2^{nd}$ TX 1050 is 125 82 s. In addition, a worst case 12-symbol end-to-end latency from a beginning 1064 of the scheduling delay 1046 to an end 1066 of the $2^{nd}$ TX 1050 is 375 μs. Different implementations and/or traffic scenarios may use different TTI periods.

As shown in FIG. 10, the 4-thin-symbol TTI scenario 1006 may use channel state feedback (CSF) instead of an ACK to control whether there will be a retransmission. For example, during the 1st TX 1048, a receiving device may generate a channel estimate based on the data received up to that point in time. This channel estimate information (e.g., CSF) may be sent on the UL. Upon receiving the channel estimate information, the transmitting device may determine whether the channel is acceptable. If the channel is not acceptable (e.g., the channel quality is poorer than expected), the transmitter may retransmit the data since it may be assumed that a retransmission will he required due to the poor channel conditions. In addition, ultimately, the receiving device may send an ACK 1058 (e.g., at the end of the processing as shown in FIG. 10). In this example, the ACK re-transmission has an extra 125 μs delay.

FIG. 11 illustrates an example of multi-thin-symbol TTI latency comparing normal timelines (e.g., corresponding to FIG. 8) and tightened timelines (e.g., corresponding to FIG. 10). A first curve 1102 corresponds to a 1-thin-symbol TTI (e.g., as in FIG. 8). A second curve 1104 corresponds to a 2-thin-symbol TTI (e.g., as in FIG. 8). A third curve 1106 corresponds to a 4-thin-symbol TTI (e.g., as in FIG. 8). A fourth curve 1108 corresponds to a 2-thin-symbol TTI with tightened RTT (e.g., as in FIG. 10). A fifth curve 1110 corresponds to a 4-thin-symbol TTI with tightened RTT (e.g., as in FIG. 10). As indicated, for a given number of transmissions, the latency ratio is lower for the multi-thin-symbol TTI scenarios.

Figure 12:
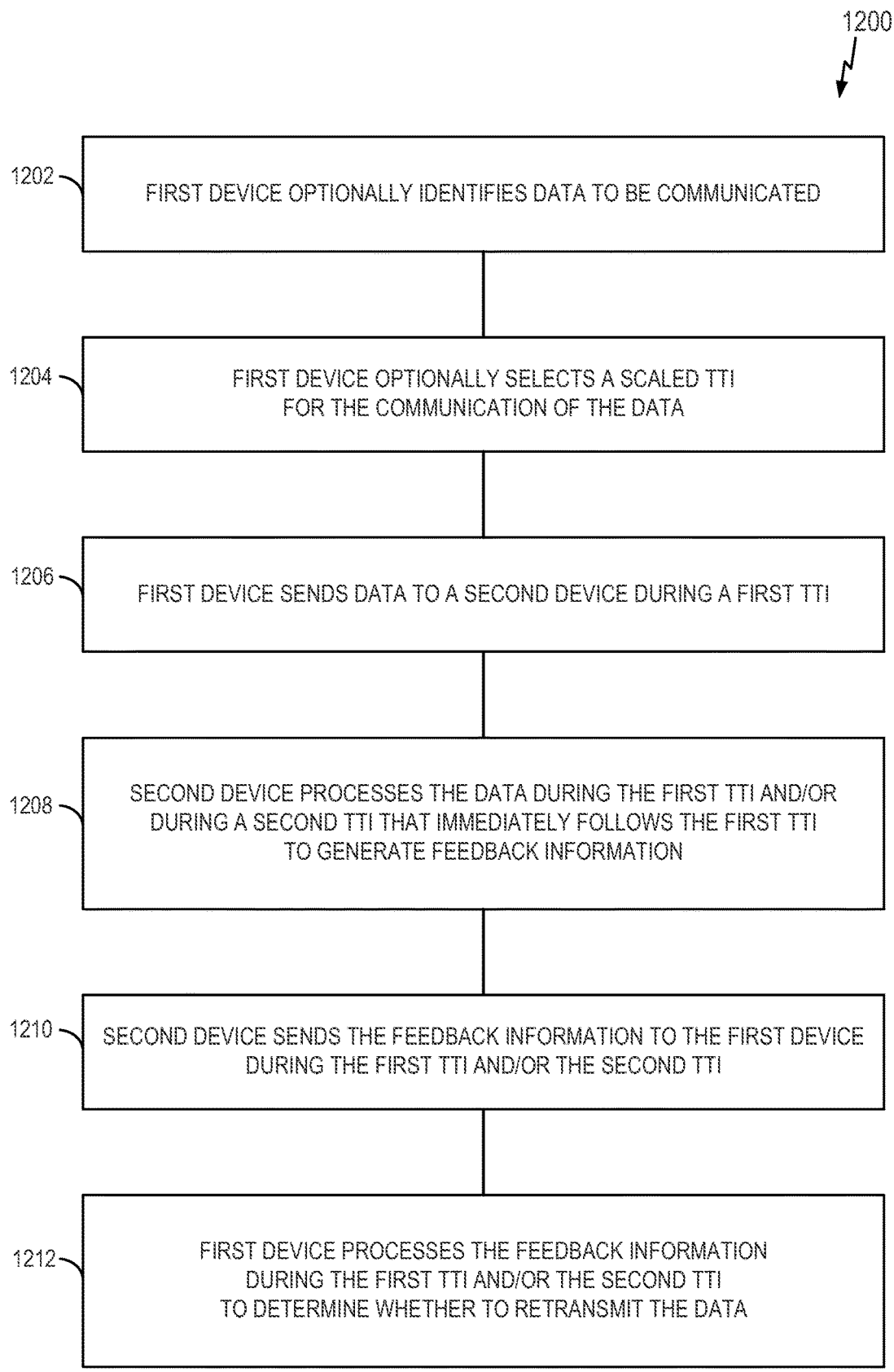
FIG. 12 illustrates an example of a process for communicating feedback information in accordance with some aspects of the disclosure.

FIG. 12 illustrates a process 1200 for communicating in accordance with some aspects of the disclosure. The process 1200 may take place within a processing circuit (e.g., the processing circuit 1310 of FIG. 13), which may be located in an access point, an access terminal, a peer device, a MiCr device, or some other suitable apparatus. Of course, in various aspects within the scope of the disclosure, the process 1200 may be implemented by any suitable apparatus capable of supporting communication operations.

At optional block 1202, a first device may identify data to be communicated. For example, a UE or an eNB may determine that mission critical traffic needs to be sent or received.

At optional block 1204, the first device may select a scaled TTI for the communication of the data. For example, the UE or eNB may elect to use a shorter TTI to meet the stricter latency requirements of the mission critical traffic, At block 1206, the first device sends data to a second device during a first TTI. The first TTI may be scaled according to block 1204.

At block 1208, upon receipt of the data, the second device processes the data to generate feedback information (e.g., an ACK, a NACK, a CSF value, etc.). As discussed above in conjunction with FIGS. 7, 8, and 10, this processing may occur during the first TTI and/or during a second TTI that immediately follows the first TTI. The second TTI may be scaled according to block 1204.

At block 1210, the second device sends the feedback information to the first device. As discussed above in conjunction with FIGS. 7, 8, and 10, the second device may transmit the feedback information during the first TTI and/or the second TTI.

At block 1212, the first device processes the feedback information to determine whether to retransmit the data. As discussed above in conjunction with FIGS. 7, 8, and 10. this processing may occur during the first TTI and/or the second TTI.

Example Apparatus

FIG. 13 illustrates a block diagram of an example hardware implementation of an apparatus 1300 configured to support communication according to one or more aspects of the disclosure. For example, the apparatus 1300 could embody an access terminal, an access point, or some other type of device. In various implementations, the apparatus 1300 could be a mobile phone, a smart phone, a tablet, a portable computer, a server, a personal computer, a sensor, an appliance, an automobile, and or any other electronic device having circuitry.

The apparatus 1300 includes a communication interface (e.g., at least one transceiver) 1302, a storage medium 1304, a user interface 1306, a memory device (e.g., a memory circuit) 1308, and a processing circuit (e.g., at least one processor) 1310. In various implementations, the user interface 1306 may include one or more of: a keypad, a display, a speaker, a microphone, a touchscreen display, of some other circuitry for receiving an input from or sending an output to a user.

These components can be coupled to and/or placed in electrical communication with one another via a signaling bus or other suitable component, represented generally by the connection lines in FIG. 13. The signaling bus may include any number of interconnecting buses and bridges depending on the specific application of the processing circuit 1310 and the overall design constraints. The signaling bus links together various circuits such that each of the communication interface 1302, the storage medium 1304, the user interface 1306, and the memory device 1308 are coupled to and/or in electrical communication with the processing circuit 1310. The signaling bus may also link various other circuits (not shown) such as timing sources, peripherals, voltage regulators, and power management circuits, which are well known in the art, and therefore, will not be described any further.

The communication interface 1302 provides a means for communicating with other apparatuses over a transmission medium. In some implementations, the communication interface 1302 includes circuitry and/or programming adapted to facilitate the communication of information bi-directionally with respect to one or more communication devices in a network. In some implementations, the communication interface 1302 is adapted to facilitate wireless communication of the apparatus 1300. In these implementations, the communication interface 1302 may be coupled to one or more antennas 1312 as shown in FIG. 13 for wireless communication within a wireless communication system. The communication interface 1302 can be configured with one or more standalone receivers and/or transmitters, as well as one or more transceivers. In the illustrated example, the communication interface 1302 includes a transmitter 1314 and a receiver 1316. The communication interface 1302 serves as one example of a means for receiving and/or means transmitting.

The memory device 1308 may represent one or more memory devices. As indicated, the memory device 1308 may maintain TTI and HARQ information 1318 along with other information used by the apparatus 1300. In some implementations, the memory device 1308 and the storage medium 1304 are implemented as a common memory component. The memory device 1308 may also be used for storing data that is manipulated by the processing circuit 1310 or some other component of the apparatus 1300.

The storage medium 1304 may represent one or more computer-readable, machine-readable, and/or processor-readable devices for storing programming, such as processor executable code or instructions (e.g., software, firmware), electronic data, databases, or other digital information. The storage medium 1304 may also be used for storing data that is manipulated by the processing circuit 1310 when executing programming. The storage medium 1304 may be any available media that can be accessed by a general purpose or special purpose processor, including portable or fixed storage devices, optical storage devices, and various other mediums capable of storing, containing or carrying programming, By way of example and not limitation, the storage medium 1304 may include magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The storage medium 1304 may be embodied in an article of manufacture (e.g., a computer program product). By way of example, a computer program product may include a computer-readable medium in packaging materials. In view of the above, in some implementations, the storage medium 1304 may be a non-transitory (e.g., tangible) storage medium.

The storage medium 1304 may be coupled to the processing circuit 1310 such that the processing circuit 1310 can read information from, and write information to, the storage medium 1304. That is, the storage medium 1304 can be coupled to the processing circuit 1310 so that the storage medium 1304 is at least accessible by the processing circuit 1310, including examples where at least one storage medium is integral to the processing circuit 1310 and/or examples where at least one storage medium is separate from the processing circuit 1310 (e.g., resident in the apparatus 1300, external to the apparatus 1300, distributed across multiple entities, etc.).

Programming stored by the storage medium 1304, when executed by the processing circuit 1310, causes the processing circuit 1310 to perform one or more of the various functions and/or process operations described herein. For example, the storage medium 1304 may include operations configured for regulating operations at one or more hardware blocks of the processing circuit 1310, as well as to utilize the communication interface 1302 for wireless communication utilizing their respective communication protocols.

The processing circuit 1310 is generally adapted for processing, including the execution of such programming stored on the storage medium 1304. As used herein, the terms "code" or "programming" shall be construed broadly to include without limitation instructions, instruction sets, data, code, code segments, program code, programs, programming, subprograms, software modules, applications, software applications, software packages, routines, subroutines, objects, executables, threads of execution, procedures, functions, etc., whether referred to as software, firmware, middleware, microcode, hardware description language, or otherwise.

The processing circuit 1310 is arranged to obtain, process and/or send data, control data access and storage, issue commands, and control other desired operations. The processing circuit 1310 may include circuitry configured to implement desired programming provided by appropriate media in at least one example. For example, the processing circuit 1310 may be implemented as one or more processors, one or more controllers, and/or other structure configured to execute executable programming. Examples of the processing circuit 1310 may include a general purpose processor, a digital signal processor (DSP), an application specific integrated circuit (ASIC), a field programmable gate array (FPGA) or other programmable logic component, discrete gate or transistor logic, discrete hardware components, or any combination thereof designed to perform the functions described herein. A general purpose processor may include a microprocessor, as well as any conventional processor, controller, microcontroller, or state machine. The processing circuit 1310 may also be implemented as a combination of computing components, such as a combination of a DSP and a microprocessor, a number of microprocessors, one or more microprocessors in conjunction with a DSP core, an ASIC and a microprocessor, or any other number of varying configurations. These examples of the processing circuit 1310 are for illustration and other suitable configurations within the scope of the disclosure are also contemplated.

According to one or more aspects of the disclosure, the processing circuit 1310 may be adapted to perform any or all of the features, processes, functions, operations and/or routines for any or all of the apparatuses described herein. For example, the processing circuit 1310 may be configured to perform any of the steps, functions, and/or processes described with respect to FIGS. 1-12 and 13-19. As used herein, the term "adapted" in relation to the processing circuit 1310 may refer to the processing circuit 1310 being one or more of configured, employed, implemented, and/or programmed to perform a particular process, function, operation and/or routine according to various features described herein.

The processing circuit 1310 may be a specialized processor, such as an application specific integrated circuit (ASIC) that serves as a means for (e.,g., structure for) carrying out any one of the operations described in conjunction with FIGS. 1-12 and 13-19. The processing circuit 1310 serves as one example of a means for receiving, a means for determining whether to control traffic, a means for controlling traffic, a means for identifying a class, a means for determining whether an indication is different, a means for triggering evaluation of a traffic routing policy, or a means for sending an indication. The processing circuit 1310 also serves as one example of a means for receiving and/or transmitting.

According to at least one example of the apparatus 1300, the processing circuit 1310 may include one or more of a circuit/module for communicating data 1320, a circuit/module for communicating feedback information 1322, a circuit/module for processing data 1324, a circuit/module for processing feedback information 1326, a circuit/module for determining that traffic is to be communicated 1328, a circuit/module for selecting a scaled TTI 1330, or a circuit/module for selecting a length of a TTI 1332.

The circuit/module for communicating data 1320 may include circuitry and/or programming (e.g., code for communicating data 1334 stored on the storage medium 1304) adapted to perform several functions relating to, for example, sending and/or receiving data. In some implementations, the data is communicated during a first transmission time interval (TTI) that comprises a plurality of symbol time periods. In this case, the circuit/module for communicating data 1320 may identify the first TTI and commence the sending of data or the receiving of data during that TTI. In some implementations, the communication interface 1302 includes the circuit/module for communicating data 1320 and/or the code for communicating data 1334.

In some scenarios, the communicating involves the circuit/module for communicating data 1320 receiving information directly from a device that transmitted. the data or receiving data from a component of the apparatus 1300 (e.g., the receiver 1316, the memory device 1308, or some other component). In this case, the circuit/module for communicating data 1320 may process (e.g., decode) the received data. The circuit/module for communicating data 1320 then outputs the received data to a component of the apparatus 1300 the memory device 1308, the circuit/module for processing data 1324, or some other component).

In some scenarios, the communicating involves sending data to another component of the apparatus 1300 (e.g., the transmitter 1314) for transmission to another device or sending data directly to an ultimate destination (e.g., if the circuit/module for communicating data 1320 includes a transmitter). In this case, the circuit/module for communicating data 1320 initially obtains data to be communicated (e.g., from the memory device 1308, the circuit/module for determining that data is to be communicated 1328, or some other component). The circuit/module for communicating data 1320 may process encode) the data to be transmitted. The circuit/module for communicating data 1320 then causes the data to be transmitted. For example, the circuit/ module for communicating data 1320 can directly transmit the data or pass the data to the transmitter 1314 for subsequent radio frequency (RF) transmission.

The circuit/module for communicating feedback information 1322 may include circuitry and/or programming (e.g., code for communicating feedback information 1336 stored on the storage medium 1304) adapted to perform several functions relating to, for example, sending and/or receiving feedback information. In some implementations, the feedback information is based on the data communicated by (e.g., received by or sent by) the circuit/module for communicating data 1320. In some scenarios, the circuit/module for communicating feedback information 1322 may communicate the feedback information during the first TTI. In this case, the circuit/module for communicating feedback information 1322 may identify the first TTI and commence the sending of the feedback information or the receiving of the feedback information during that TTI. In some scenarios, the circuit/module for communicating feedback information 1322 may communicate the feedback information during a second TTI that comprises a plurality of symbol time periods and successively follows the first TTI. In this case, the circuit/module for communicating feedback information 1322 may identify the second TTI and commence the sending of the feedback information or the receiving of the feedback information during that TTI. In some implementations, the communication interface 1302 includes the circuit/module for communicating feedback information 1322 and/or the code for communicating feedback information 1336.

In some scenarios, the communicating involves the circuit/module for communicating feedback information 1322 receiving feedback information directly from a device that transmitted the feedback information or receiving feedback information from a component of the apparatus 1300 (e.g., the receiver 1316, the memory device 1308, or some other component). In this case, the circuit/module for communicating feedback information 1322 may process (e.g., decode) the received feedback information. The circuit/module for communicating feedback information 1322 then outputs the received feedback information to a component of the apparatus 1300 (e.g., the memory device 1308, the circuit/module for processing feedback information 1326, or some other component).

In some scenarios, the communicating involves sending feedback information to another component of the apparatus 1300 (e.g., the transmitter 1314) for transmission to another device or sending feedback information directly to an ultimate destination (e.g., if the circuit/module for communicating feedback information 1322 includes a transmitter). In this case, the circuit/module for communicating feedback information 1322 initially obtains feedback information to be communicated (e.g., from the memory device 1308, the circuit/module for processing data 1324, or some other component). The circuit/module for communicating feedback information 1322 may process (e.g., encode) the feedback information to be transmitted. The circuit/module for communicating feedback information 1322 then causes the feedback information to be transmitted. For example, the circuit/module for communicating feedback information 1322 can directly transmit the feedback information or pass the feedback information to the transmitter 1314 for subsequent radio frequency (RF) transmission, The circuit/module for processing data 1324 may include circuitry and/or programming (e.g., code for processing data 1338 stored on the storage medium 1304) adapted to perform several functions relating to, for example, processing data to generate feedback information. In some scenarios, at least a portion of the data may be processed during the second TTI to generate the feedback information. In some scenarios, at least a portion (e.g., another portion) of the data may be processed during the first TTI to generate the feedback information. In some scenarios, the data is processed to generate channel state feedback information based on the data.

At some point in time, the circuit/module for processing data 1324 obtains the data to be processed. For example, the circuit/module for processing data 1324 may obtain this information from a component of the apparatus 1300 e.g., from the circuit/module for communicating data 1320, the memory device 1308, the communication interface 1302, or some other component). The circuit/module for processing data 1324 then processes the data (e.g., performs a HARQ process, performs error checking, etc.) to generate feedback information (e.g., a positive acknowledgement, a negative acknowledgement, an error rate, etc.). The circuit/module for processing data 1324 may then said the feedback information to a component of the apparatus 1100 (e.g., the circuit/module for communicating feedback information 1322, the memory device 1308, the communication interface 1302, or some other component).

The circuit/module for processing feedback information 1326 may include circuitry and/or programming (e.g., code for processing feedback information 1340 stored on the storage medium 1304) adapted to perform several functions relating to, for example, processing feedback information to determine whether data needs to be retransmitted. In some scenarios, at least a portion of the feedback information may be processed dining the second TTI to determine whether to retransmit the data. In some scenarios, at least a portion (e.g., another portion) of the feedback information may be processed during the first TTI to determine whether to retransmit the data. In some scenarios, channel state feedback information is processed to determine whether to retransmit the data.

At some point in time, the circuit/module for processing feedback information 1326 obtains the feedback information to be processed. For example, the circuit/module for processing feedback information 1326 may obtain this feedback information from a component of the apparatus 1300 (e.g., from the circuit/module for communicating feedback information 1322, the memory device 1308, the communication interface 1302, or some other component). The circuit/module for processing feedback information 1326 then processes the feedback information (e.g., compares a received value with a first value indicative of success and a second value indicative of failure) to determine whether the data was successfully received by another apparatus. The circuit/module for processing feedback information 1326 may then send an indication of the result of the processing (e.g., whether data needs to be retransmitted) to a component of the apparatus 1100 (e.g., the circuit/module for determining that traffic is to be communicated 1328, the memory device 1308, the communication interface 1302, or some other component).

The circuit/module for determining that traffic is to be communicated 1328 may include circuitry and/or programming (e.g., code for determining that traffic is to be communicated 1342 stored on the storage medium 1304) adapted to perform several functions relating to, for example, determining whether traffic (e.g., first traffic) is to be sent or received. In some scenarios, the first traffic is associated with a first latency period that is different from a second latency period associated with second traffic currently being communicated.

At some point in time, the circuit/module for determining that traffic is to be communicated 1328 may obtain an indication that data needs to be sent or is expected to be received (e.g., based on a schedule that indicates which TTIs are to be used for transmission or reception, based on buffer status, etc.). The circuit/module for determining that traffic is to be communicated 1328 may obtain this indication, for example, from the circuit/module for communicating data 1320, the memory device 1308, the communication interface 1302, or some other component. The circuit/module for determining that traffic is to be communicated 1328 then outputs an indication of the corresponding determination of whether traffic is to be communicated to a component of the apparatus 1300 (e.g., to the memory device 1308, the circuit/module for selecting a scaled TTI 1330 or some other component).

The circuit/module for selecting a scaled TTI 1330 may include circuitry and/or programming (e.g., code for selecting a scaled TTI 1344 stored on the storage medium 1304) adapted to perform several functions relating to, for example, selecting a scaled TTI for communicating traffic. In some scenarios, the scaled TTI specifies the plurality of symbol time periods for the first TTI and/or the second TTI, and the scaled TTI is associated with hybrid automatic repeat request HARQ communication during the second TTI. In some scenarios, the scaled TTI is further associated with a time period for the HARQ communication being spread over a plurality of TTIs.

In some implementations, the circuit/module for selecting a scaled TTI 1330 selects a TTI length based on the type of traffic to be communicated. For example, the TTI may be scaled up to accommodate a switch between mission critical traffic and nominal traffic. To this end, the circuit/module for selecting a scaled TTI 1330 may obtain an indication of the traffic to be communicated from the memory device 1308, the circuit/module for determining that traffic is to be communicated 1328, the communication interface 1302, or some other component). The circuit/module for selecting a scaled TTI 1330 may then output an indication of the selection to a component of the apparatus 1300 the memory device 1308, the circuit/module for communicating data 1320, the communication interface 1302, or some other component).

The circuit/module for selecting a length of a TTI 1332 may include circuitry and/or programming (e.g., code for selecting a length of a TTI 1346 stored on the storage medium 1304) adapted to perform several functions relating to, for example, selecting a TTI length (e.g., for a first TTI and a second TTI) to match a processing and acknowledgement time interval. To this end, the circuit/module for selecting a length of a 1332 obtains an indication of the processing and acknowledgement time interval (e.g., from the memory device 1308, the circuit/module for communicating data 1320, the communication interface 1302, or some other component). The circuit/module for selecting a length of a TTI 1332 may then set the TTI length equal to this interval. In addition, the circuit/module for selecting a length of a TTI 1332 may output an indication of the selection to a component of the apparatus 1300 (e.g., the memory device 1308, the circuit/module for communicating data 1320, the communication interface 1302, or some other component).

As mentioned above, programming stored by the storage medium 1304, when executed by the processing circuit 1310, causes the processing circuit 1310 to perform one or more of the various functions and/or process operations described herein. For example, the programming, when executed by the processing circuit 1310, may cause the processing circuit 1310 to perform the various functions, steps, and/or processes described herein with respect to FIGS. 1-12 and 13-19 in various implementations. As shown in FIG. 13, the storage medium 1304 may include one or more of the code for communicating data 1334, the code for communicating feedback information 1336, the code for processing data 1338, the code for processing feedback information 1340, the code for determining that traffic is to be communicated 1342, the code for selecting a scaled TTI 1344, or the code for selecting a length of a TTI 1346.

Example Processes

Figure 14:
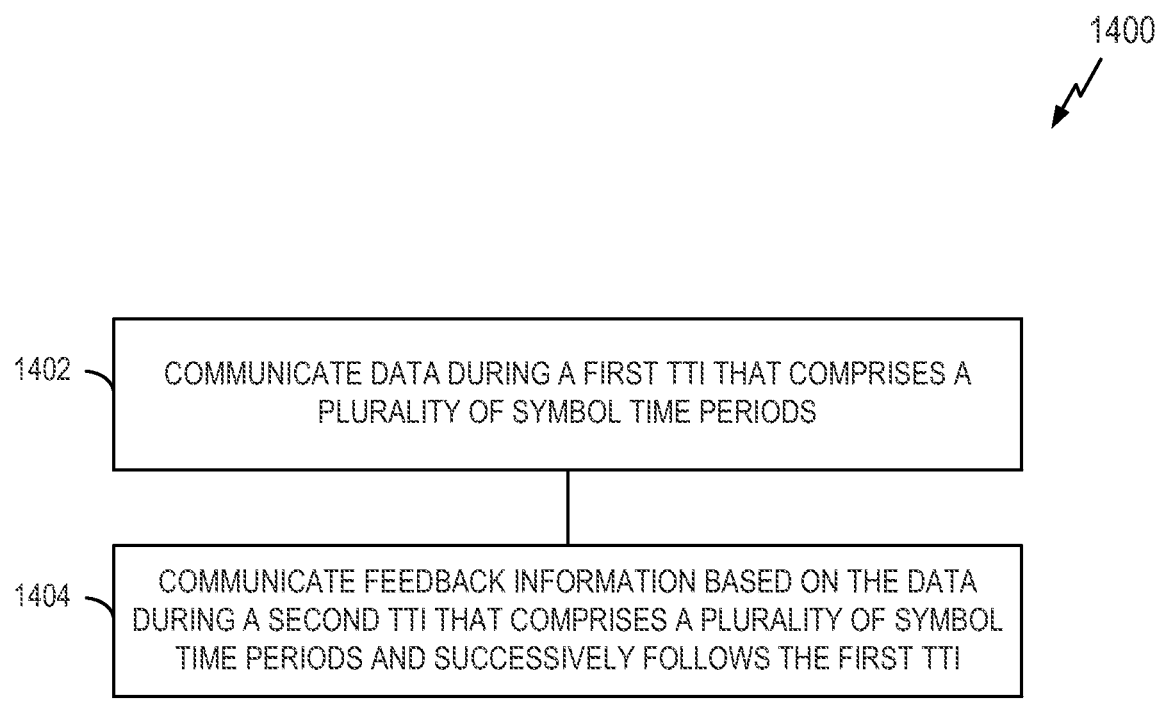
FIG. 14 illustrates an example of a process for communicating feedback information during a second TTI in accordance with some aspects of the disclosure.

FIG. 14 illustrates a process 1400 for communicating in accordance with some aspects of the disclosure. The process 1400 may take place within a processing circuit (e.g., the processing circuit 1310 of FIG. 13), which may be located in an access point, an access terminal, a peer device, a MiCr device, or some other suitable apparatus. Of course, in various aspects within the scope of the disclosure, the process 1400 may be implemented by any suitable apparatus capable of supporting communication operations.

At block 1402, an apparatus communicates (e.g., sends or receives) data during a first TTI. The first TTI includes a plurality of symbol time periods. Thus, the first TTI may correspond to a 2-thin-symbol TTI, a 4-thin-symbol TTI, etc., as taught herein. For example, the first TTI may correspond to the SYMB0 730 and the SYMB1 732 of FIG. 7, the $1^{st}$ TX 810 of FIG. 8, the TX 1010 of FIG. 10, the $1^{st}$ TX 1030 of FIG. 10, or the $1^{st}$ TX 1048 of FIG. 10. In some aspects, pilot information and/or control information may be front-loaded, at least in part, in the symbol time periods of the first TTI. For example, the first symbol time period nay include pilot information and control information.

In some scenarios, the process 1400 may be performed by an apparatus that receives the data. Thus, in some aspects, the communicating of the data at block 1402 may involve receiving the data.

In some scenarios, the process 1400 may be performed by an apparatus that transmits the data. Thus, in some aspects, the communicating of the data at block 1402 may involve transmitting the data.

in some aspects, the data may include mission critical traffic. Accordingly, the first TTI may be a scaled TTI as taught herein.

At block 1404, the apparatus communicates (e.g., sends or receives) feedback information based on the data during a second TTI. The second TTI successively follows the first TTI. For example, the second TTI may correspond to the third TTI 734 of FIG. 7 the TTI that immediately follows the SYMB1 732), the third TTI for the gap 812 of FIG. 8, the fourth TTI for the second gap 1014 of FIG. 10, the third TTI for the gap 1032 of FIG. 10, or the $2^{nd}$ TX 1050 of FIG. 10.

The second TTI may include a plurality of symbol time periods. For example, the second TTI may correspond to a 2-thin-symbol TTI, a 4-thin-symbol TTI, etc., as taught herein. In some aspects, pilot information may be front-loaded, at least in part, in the symbol time periods of the second TTI. For example, the first symbol time period may include pilot information.

In scenarios where the process 1400 is performed by an apparatus that receives the data at block 1402, the communicating of the feedback information may involve transmitting the feedback information. In this case, to generate the feedback information (e.g., ACK/NACK information, channel state feedback information, etc.), the apparatus may process at least a portion of the received data during the second TTI and/or the first TTI.

In scenarios where the process 1400 is performed by an apparatus that transmits the data at block 1402, the communicating of the feedback information may involve receiving the feedback information. In this case, to determine whether to retransmit the data transmitted at block 1402, the apparatus may process at least a portion of the received feedback information (e.g., ACK/NACK information, channel state feedback information, etc.) during the second TTI and/or the first TTI.

In some aspects, the feedback information may include pilot information and acknowledgement information. In this case, the pilot information and the acknowledgement nformation may be communicated during a common (i.e., the same) symbol period.

In some aspects, the feedback information may include a plurality of acknowledgement indications and/or a plurality of pilot indications.

Figure 15:
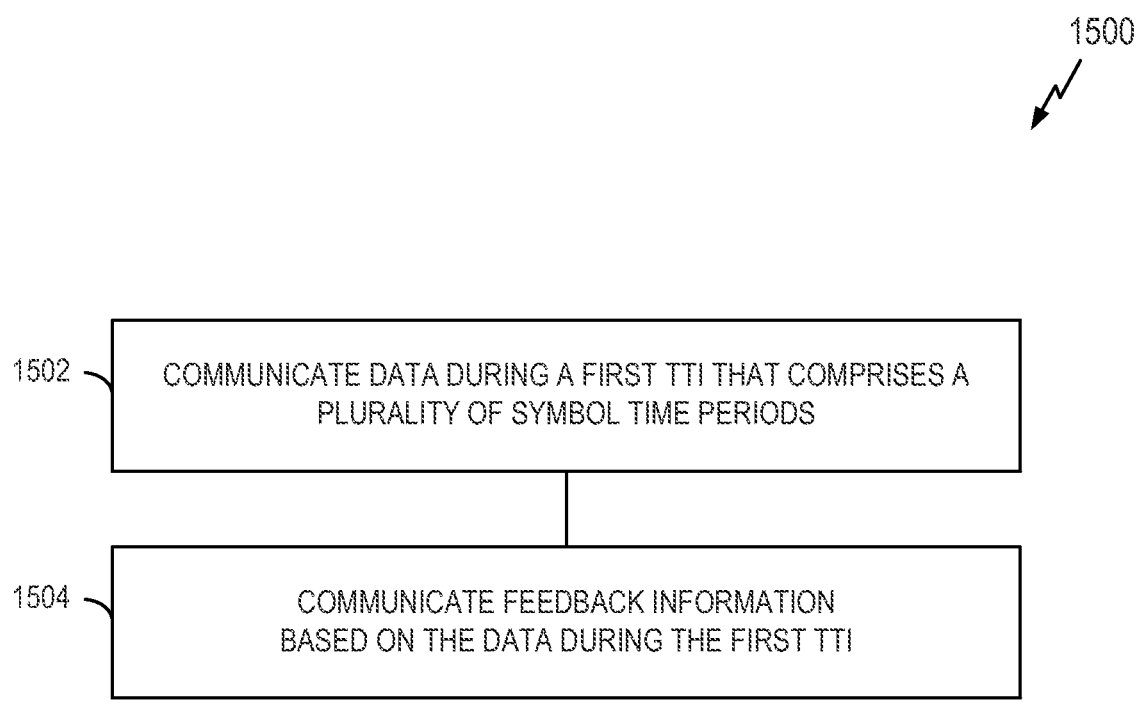
FIG. 15 illustrates an example of a process for communicating feedback information during a first TTI in accordance with some aspects of the disclosure.

FIG. 15 illustrates a process 1500 for communicating in accordance with sonic aspects of the disclosure. The process 1500 may take place within a processing circuit (e.g., the processing circuit 1310 of FIG. 13), which may be located in an access point, an access terminal, a peer device, a MiCr device, or some other suitable apparatus. Of course, in various aspects within the scope of the disclosure, the process 1500 may be implemented by any suitable apparatus capable of supporting communication operations.

At block 1502, an apparatus communicates (e.g., sends or receives) data during a first TTI. The first TTI includes a plurality of symbol time periods. Thus, the first TTI may correspond to a 2-thin-symbol TTI, a 4-thin-symbol TTI, etc., as taught herein. For example, the first TTI may correspond to the SYMB0 730 and the SYMB1 732 of FIG. 7, the $1^{st}$ TX 810 of FIG. 8, the $1^{st}$ TX 1010 of FIG. 10, the TX 1030 of FIG. 10, or the $1^{st}$ TX 1048 of FIG. 10. In some aspects, pilot information and/or control information may be front-loaded, at least in part, in the symbol time periods of the first TTI. For example, the first symbol time period may include pilot information and control information.

In some scenarios, the process 1500 may be performed by an apparatus that receives the data. Thus, in some aspects, the communicating of the data at block 1502 may involve receiving the data.

In some scenarios, the process 1500 may be performed by an apparatus that transmits the data. Thus, in some aspects, the communicating of the data at block 1502 may involve transmitting the data.

in some aspects, the data may include mission critical traffic. Accordingly, the first TTI may be a scaled TTI as taught herein.

At block 1504, the apparatus communicates (e.g., sends or receives) feedback information based on the data during the first TTI.

In scenarios where the process 1500 is performed by an apparatus that receives the data at block 1502, the communicating of the feedback information may involve transmitting the feedback information. In this case, to generate the feedback information (e.g., ACK/NACK information, channel state feedback information, etc.), the apparatus may process at least a portion of the received data during the first TTI and/or the second TTI.

In scenarios where the process 1500 is performed by an apparatus that transmits the data at block 1502, the communicating of the feedback information may involve receiving the feedback information. In this case, to determine whether to retransmit the data transmitted at block 1502, the apparatus may process at least a portion of the received feedback information (e.g., ACK/NACK information, channel state feedback information, etc.) during the first TTI and/or the second In In some aspects, the feedback information may include pilot information and acknowledgement information. In this case, the pilot information and the acknowledgement information may be communicated during a common (i.e., the same) symbol period.

In some aspects, the feedback information may include a plurality of acknowledgement indications and/or a plurality of pilot indications. In some aspects, pilot information may be front-loaded, at least in part, in symbol time periods that can the feedback information. For example, the first symbol time period may include pilot information.

Figure 16:
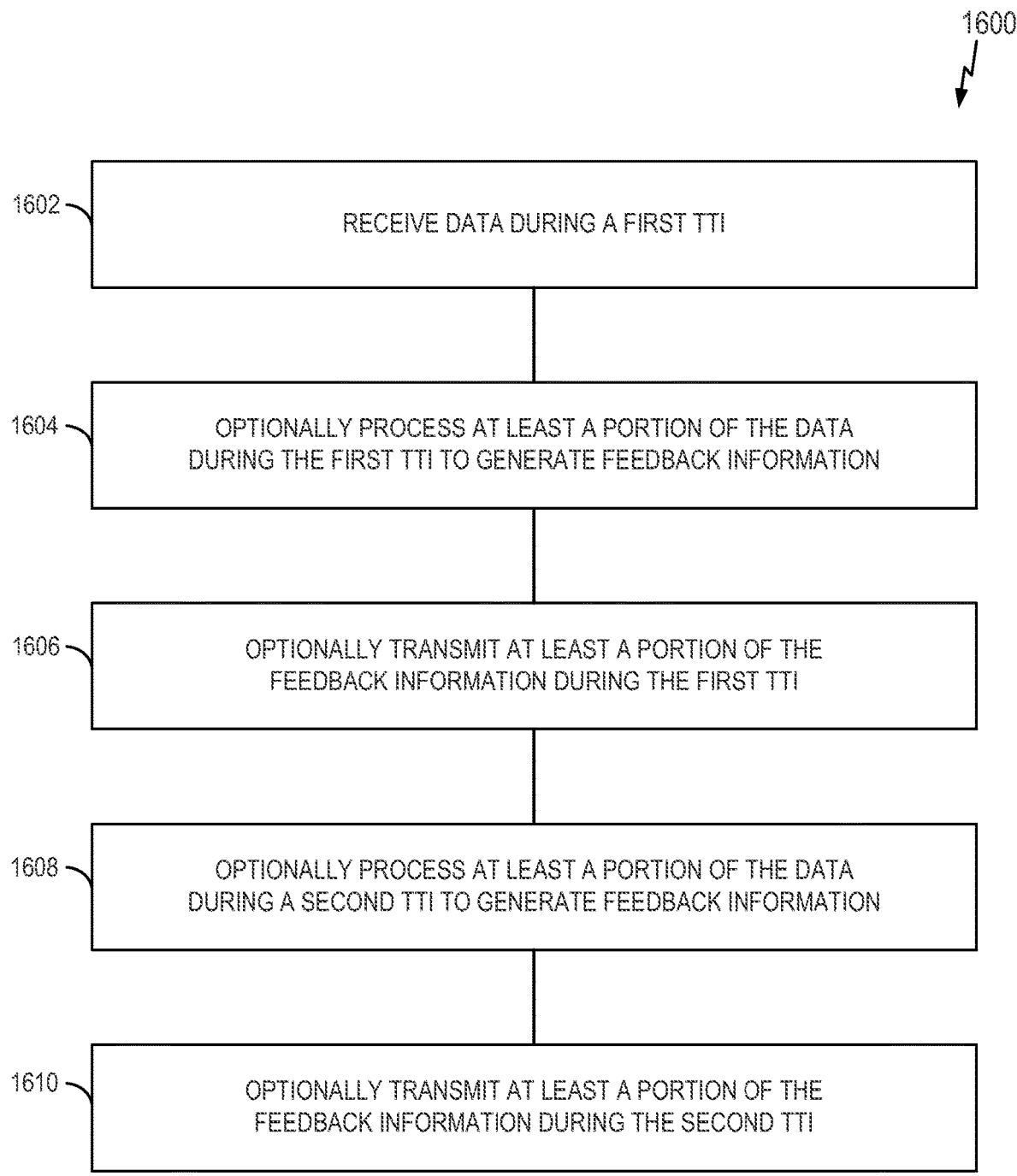
FIG. 16 illustrates an example of a process for generating feedback information in accordance with some aspects of the disclosure.

FIG. 16 illustrates sample operations of a process 1600 that may be employed in conjunction with the process 1400 of FIG. 14 and/or the process 1500 of FIG. 15 in accordance with some aspects of the disclosure. The process 1600 may take place within a processing circuit (e.g., the processing circuit 1310 of FIG. 13), which may be located in an access point, an access terminal, a peer device, a MiCr device, or some other suitable apparatus. Of course, in various aspects within the scope of the disclosure, the process 1600 may be implemented by any suitable apparatus capable of supporting communication operations.

At bock 1602, the apparatus receives data. Thus, in some aspects, the apparatus may correspond to an apparatus that receives data communicated during a first TTI at block 1402 of FIG. 14 or block 1502 of FIG. 15.

optional block 1604, during the first TTI, the apparatus may process at least a portion of the data received at block 1602 to generate feedback information. In a scenario where feedback information includes channel state feedback information, the apparatus may process the data to generate the channel state feedback information.

At optional block 1606, the apparatus may transmit at least a portion of the feedback information during the first TTI. For example, the apparatus may transmit at least one of: a pilot, an ACK, or CSF information.

At optional block 1608, during the second TTI, the apparatus may process at least a portion (e.g., another portion) of the data received at block 1602 to generate feedback information. In a scenario where feedback information includes channel state feedback information, the apparatus may process the data to generate the channel state feedback information.

At optional block 1610, the apparatus may transmit at least a portion (e.g., another portion) of the feedback information during the second TTI. For example, the apparatus may transmit at least one of: a pilot, an ACK, or CSF information.

Figure 17:
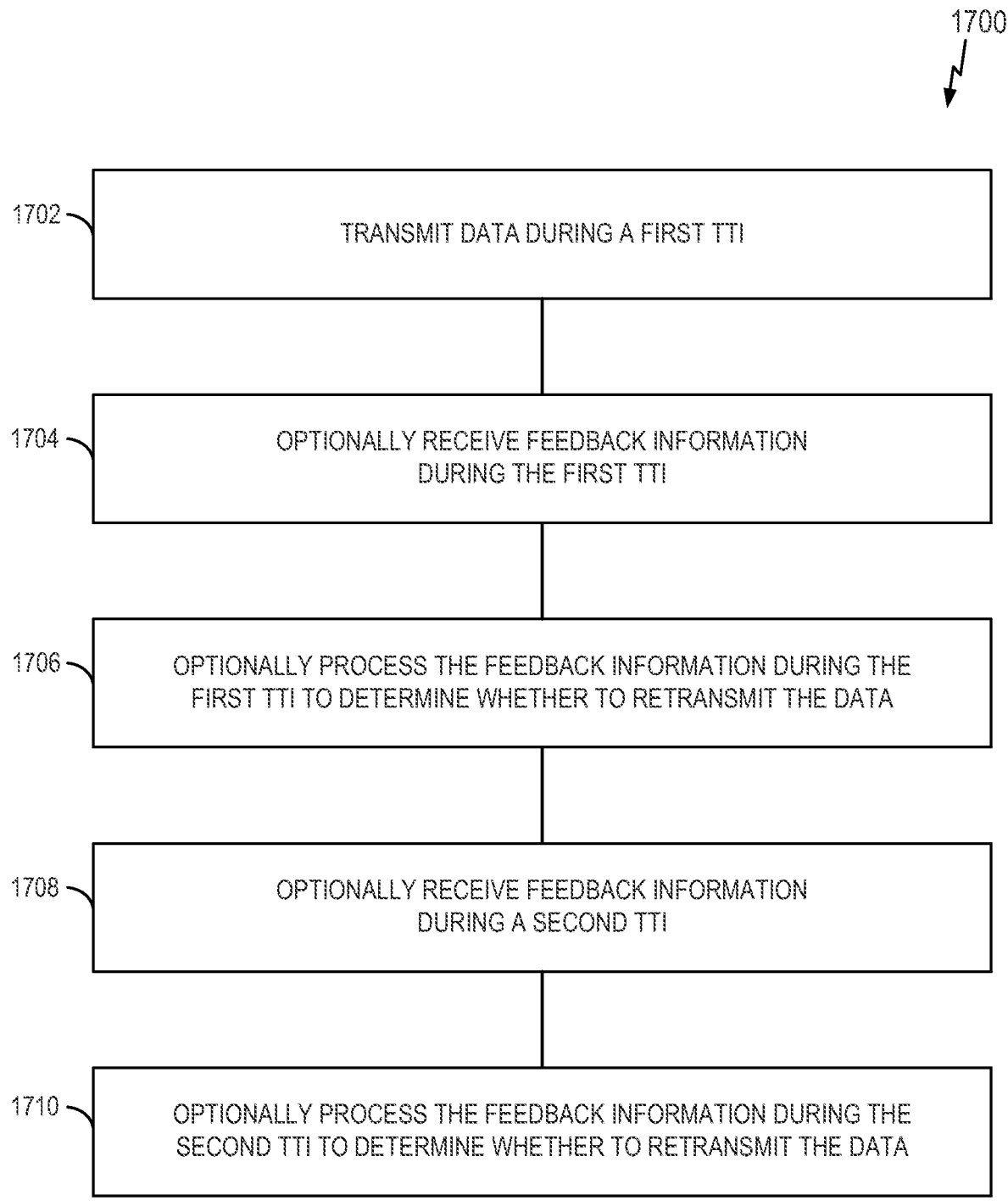
FIG. 17 illustrates an example of a process for determining whether to retransmit data in accordance with some aspects of the disclosure.

FIG. 17 illustrates sample operations of a process 1700 that may be employed in conjunction with the process 1400 of FIG. 14 and/or the process 1500 of FIG. 15 in accordance with some aspects of the disclosure. The process 1700 may take place within a processing circuit (e.g., the processing circuit 1310 of FIG. 13), which may be located in an access point, an access terminal, a peer device, a MiCr device, or some other suitable apparatus. Of course, in various aspects within the scope of the disclosure, the process 1700 may be implemented by any suitable apparatus capable of supporting communication operations.

At block 1702, the apparatus transmits data during a first TTI. Thus, in some aspects, the apparatus may correspond to an apparatus that transmits data communicated during a first TTI at block 1402 of FIG. 14 or block 1502 of FIG. 15.

At optional block 1704, the apparatus may receive feedback information during the first TTI. This feedback information corresponds to the data transmitted at block 1702.

At optional block 1706, the apparatus may process the feedback information received at block 1704. For example, during the first TTI, the apparatus may process at least a portion of the feedback information to determine whether to retransmit the data that was originally transmitted at block 1702. In a scenario where the feedback information includes channel state feedback information, the apparatus may process the channel state feedback information to determine whether to retransmit the data.

At optional block 1708, the apparatus may receive feedback information during the second TTI. This feedback information corresponds to the data transmitted at block 1702.

At optional block 1710, the apparatus may process the feedback information received at block 1708. For example, during the second TTI, the apparatus may process at least a portion of the feedback information to determine whether to retransmit the data that was originally transmitted at block 1702. In a scenario where the feedback information includes channel state feedback information, the apparatus may process the channel state feedback information to determine whether to retransmit the data.

Figure 18:
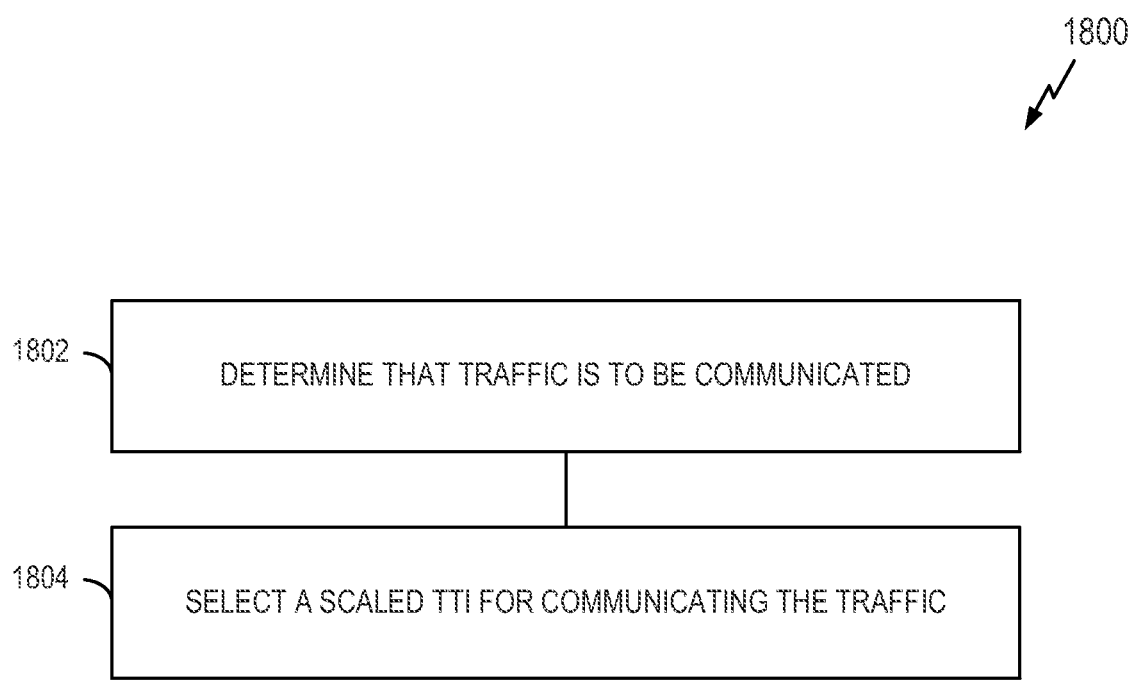
FIG. 18 illustrates an example of a process for selecting a scaled TTI in accordance with some aspects of the disclosure.

FIG. 18 illustrates sample operations of a process 1800 that may be employed in conjunction with the process 1400 of FIG. 14 and/or the process 1500 of FIG. 15 in accordance with some aspects of the disclosure. The process 1800 may take place within a processing circuit (e.g., the processing circuit 1310 of FIG. 13), which may be located in an access point, an access terminal, a peer device, a MiCr device, or some other suitable apparatus. Of course, in various aspects within the scope of the disclosure, the process 1800 may be implemented by any suitable apparatus capable of supporting communication operations.

At block 1802, an apparatus determines that traffic (e.g., data) is to be communicated. Here, first traffic to be communicated may be associated with a first latency period that is different from a second latency period associated with second traffic currently being communicated.

At block 1804, the apparatus selects a scaled TTI for communicating the traffic of block 1802. The scaled TTI may specify the plurality of symbol time periods for each of the first TTI and the second TTI. In addition, the scaled TTI may be associated with hybrid automatic repeat request (HARQ) communication during the second TTI. In some aspects, the scaled TTI may be associated with a time period for the HARQ communication being spread over a plurality of TTIs.

Figure 19:
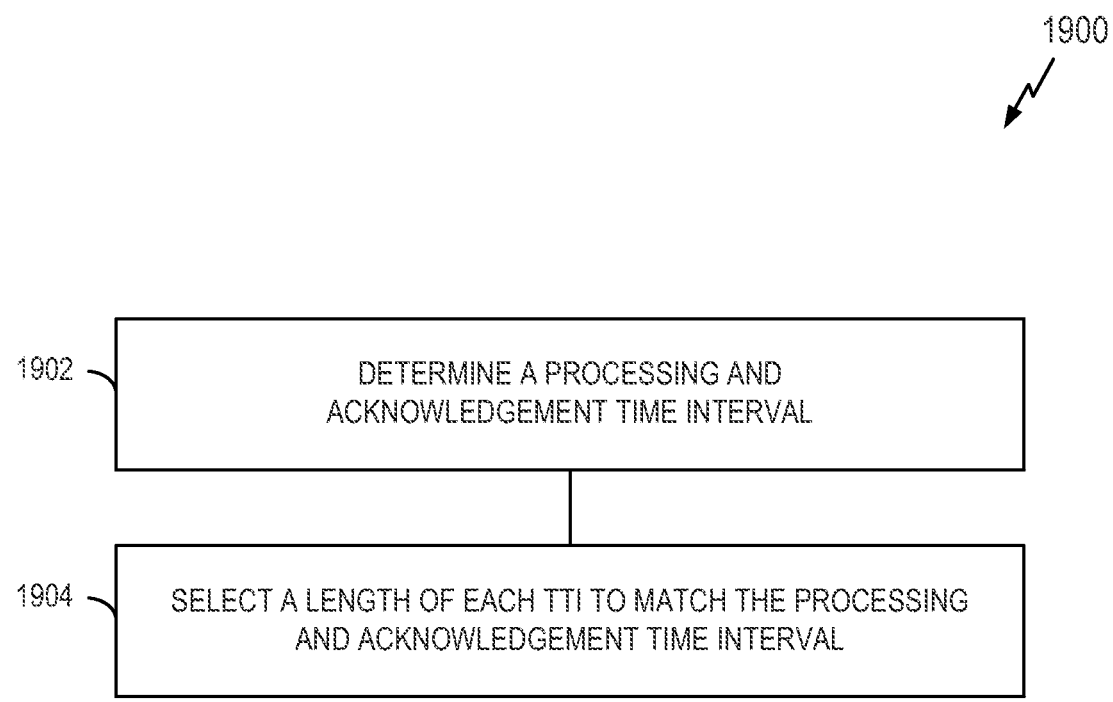
FIG. 19 illustrates an example of a process for selecting a length of a TTI in accordance with some aspects of the disclosure.

FIG. 19 illustrates sample operations of a process 1900 that may be employed in conjunction with the process 1400 of FIG. 14 and/or the process 1500 of FIG. 15 in accordance with some aspects of the disclosure. The process 1900 may take place within a processing circuit (e.g., the processing circuit 1310 of FIG. 13), which may be located in an access point, an access terminal, a peer device, a MiCr device, or some other suitable apparatus. Of course, in various aspects within the scope of the disclosure, the process 1900 may be implemented by any suitable apparatus capable of supporting communication operations.

At block 1902, an apparatus determines a processing and acknowledgement time interval. For example, the apparatus may maintain a record of the amount of time it takes the apparatus to process and acknowledge particular types of traffic. Thus, in some cases, the apparatus will identify the processing and acknowledgement time interval associated with a particular type of traffic that needs to be communicated.

At block 1904, the apparatus selects a length of each TTI to he used for communication (e.g., the first TTI and the second TTI of FIGS. 14-17). In some aspects, the apparatus may select a length of each of the first TTI and the second TTI to match the processing and acknowledgement time interval determined at block 1902 (e.g., as indicated for the 4-thin-symbol TTI scenario 1006 of FIG. 10).

Additional Aspects

One or more of the components, steps, features and/or functions illustrated in the figures may be rearranged and/or combined into a single component, step, feature or function or embodied in several components, steps, or functions. Additional elements, components, steps, and/or functions may also be added without departing from novel features disclosed herein. The apparatus, devices, and/or components illustrated in the figures may be configured to perform one or more of the methods, features, or steps described herein. The novel algorithms described herein may also be efficiently implemented in software and/or embedded in hardware.

It is to be understood that the specific order or hierarchy of steps in the methods disclosed is an illustration of example processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein. Additional elements, components, steps, and/or functions may also be added or not utilized without departing from the disclosure, While features of the disclosure may have been discussed relative to certain implementations and figures, all implementations of the disclosure can include one or more of the advantageous features discussed herein, in other words, while one or more implementations may have been discussed as having certain advantageous features, one or more of such features may also be used in accordance with any of the various implementations discussed herein. In similar fashion, while example implementations may have been discussed herein as device, system, or method implementations, it should be understood that such example implementations can be implemented in various devices, systems, and methods.

Also, it is noted that at least some implementations have been described as a process that is depicted as a flowchart, a flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed. In some aspects, a process may correspond to a method, a function, a procedure, a subroutine, a subprogram, etc. When a process corresponds to a function, its termination corresponds to a return of the function to the calling function or the main function. One or more of the various methods described herein may he partially or fully implemented by programming (e.g., instructions and/or data) that may be stored in a machine-readable, computer-readable, and/or processor-readable storage medium, and executed by one or more processors, machines and/or devices.

Those of skill in the art would further appreciate that the various illustrative logical blocks, modules, circuits, and algorithm steps described in connection with the implementations disclosed herein may be implemented as hardware, software, firmware, middleware, microcode, or any combination thereof. To clearly illustrate this interchangeability, various illustrative components, blocks, modules, circuits, and steps have been described above generally in terms of their functionality. Whether such functionality is implemented as hardware or software depends upon the particular application and design constraints imposed on the overall system.

Within the disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another even if they do not directly physically touch each other. For instance, a first die may be coupled to a second die in a package even though the first die is never directly physically in contact with the second die. The terms "circuit" and "circuitry" are used broadly, and intended to include both hardware implementations of electrical devices and conductors that, when connected and configured, enable the performance of the functions described in the disclosure, without limitation as to the type of electronic circuits, as well as software implementations of information and instructions that, when executed by a processor, enable the performance of the functions described in the disclosure.

As used herein, the term "determining" encompasses a wide variety of actions. For example, "determining" may include calculating, computing, processing, deriving, investigating, looking up (e.g., looking up in a table, a database or another data structure), ascertaining, and the like. Also, "determining" may include receiving (e.g., receiving information), accessing (e.g., accessing data in a memory), and the like. Also, "determining" may include resolving, selecting, choosing, establishing, and the like, The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C, § 112, sixth paragraph, unless the element is expressly recited using the phrase "means for" or, in the case of a method claim, the element is recited using the phrase "step for."

Accordingly, the various features associate with the examples described herein and shown in the accompanying drawings can be implemented in different examples and implementations without departing from the scope of the disclosure. Therefore, although certain specific constructions and arrangements have been described and shown in the accompanying drawings, such implementations are merely illustrative and not restrictive of the scope of the disclosure, since various other additions and modifications to, and deletions from, the described implementations will be apparent to one of ordinary skill in the art. Thus, the scope of the disclosure is only determined by the literal language, and legal equivalents, of the claims which follow.

What is claimed is:

1. A method of wireless communication by an apparatus, the method comprising:
   communicating data during a first transmission time interval (TTI) that comprises a plurality of symbol time periods including a first symbol time period that precedes any other symbol time period of the plurality of symbol time periods of the first TTI;
   communicating pilot information via a first frequency band during the first symbol time period;
   communicating control information via a second frequency band during the first symbol time period; and
   communicating feedback information based on the data during a second TTI that comprises a plurality of symbol time periods and follows the first TTI.

2. The method of claim 1, wherein:
   the communicating of the data comprises receiving the data;
   the communicating of the feedback information comprises transmitting the feedback information; and
   the method further comprises processing at least a portion of the data during the second TTI to generate the feedback information.

3. The method of claim 2, further comprising processing at least another portion of the data during the first TTI to generate the feedback information.

4. The method of claim 2, wherein:
   the feedback information comprises channel state feedback information; and
   the method further comprises processing the data to generate the channel state feedback information.

5. The method of claim 1, wherein:
   the communicating of the data comprises transmitting the data;
   the communicating of the feedback information comprises receiving the feedback information; and
   the method further comprises processing at least a portion of the feedback information during the second TTI to determine whether to retransmit the data.

6. The method of claim 5, further comprising:
   processing at least another portion of the feedback information during the first TTI to determine whether to retransmit the data.

7. The method of claim 5, wherein:
   the feedback information comprises channel state feedback information; and
   the method further comprises processing the channel state feedback information to determine whether to retransmit the data.

8. The method of claim 1, wherein:
the feedback information comprises pilot information and acknowledgement information; and
the pilot information is front-loaded in the symbol time periods of the second TTI.

9. The method of claim 1, wherein:
the feedback information comprises pilot information and acknowledgement information; and
the pilot information and the acknowledgement information are communicated during a common symbol period.

10. The method of claim 1, wherein the data comprises mission critical traffic.

11. The method of claim 1, wherein the communication of the feedback information comprises hybrid automatic repeat request (HARQ) communication.

12. The method of claim 11, wherein the scaled TTI is further associated with a time period for the HARQ communication being spread over a plurality of TTIs.

13. The method of claim 1, wherein:
the first TTI and the second TTI have a common duration; and
the second TTI successively follows the first TTI.

14. The method of claim 1, wherein the feedback information comprises a plurality of pilot indications and/or a plurality of acknowledgement indications.

15. The method of claim 1, further comprising:
selecting a length of each of the first TTI and the second TTI to match a processing and acknowledgement time interval.

16. An apparatus for wireless communication comprising:
a memory device; and
a processing circuit coupled to the memory device and configured to:
communicate data during a first transmission time interval (TTI) that comprises a plurality of symbol time periods including a first symbol time period that precedes any other symbol time period of the plurality of symbol time periods of the first TTI,
communicate pilot information via a first frequency band during the first symbol time period,
communicate control information via a second frequency band during the first symbol time period, and
communicate feedback information based on the data during a second TTI that comprises a plurality of symbol time periods and follows the first TTI.

17. The apparatus of claim 16, wherein:
the communicating of the data comprises receiving the data;
the communicating of the feedback information comprises transmitting the feedback information; and
the processing circuit is further configured to process at least a portion of the data during the second TTI to generate the feedback information.

18. The apparatus of claim 17, wherein the processing circuit is further configured to process at least another portion of the data during the first TTI to generate the feedback information.

19. The apparatus of claim 17, wherein:
the feedback information comprises channel state feedback information; and
the processing circuit is further configured to process the data to generate the channel state feedback information.

20. The apparatus of claim 16, wherein:
the communicating of the data comprises transmitting the data;
the communicating of the feedback information comprises receiving the feedback information; and
the processing circuit is further configured to process at least a portion of the feedback information during the second TTI to determine whether to retransmit the data.

21. The apparatus of claim 20, wherein the processing circuit is further configured to:
process at least another portion of the feedback information during the first TTI to determine whether to retransmit the data.

22. The apparatus of claim 20, wherein:
the feedback information comprises channel state feedback information; and
the processing circuit is further configured to process the channel state feedback information to determine whether to retransmit the data.

23. The apparatus of claim 16, wherein the communication of the feedback information comprises hybrid automatic repeat request (HARQ) communication.

24. The apparatus of claim 16, wherein the processing circuit is further configured to:
select a length of each of the first TTI and the second TTI to match a processing and acknowledgement time interval.

25. An apparatus for wireless communication comprising:
means for communicating data during a first transmission time interval (TTI) that comprises a plurality of symbol time periods including a first symbol time period that precedes any other symbol time period of the plurality of symbol time periods of the first TTI, wherein the means for communicating data is configured to communicate pilot information via a first frequency band during the first symbol time period and communicate control information via a second frequency band during the first symbol time period; and
means for communicating feedback information based on the data during a second TTI that comprises a plurality of symbol time periods and follows the first TTI.

26. The apparatus of claim 25, wherein:
the communicating of the data comprises receiving the data;
the communicating of the feedback information comprises transmitting the feedback information; and
the apparatus further comprises means for processing at least a portion of the data during the second TTI to generate the feedback information.

27. The apparatus of claim 25, wherein:
the communicating of the data comprises transmitting the data;
the communicating of the feedback information comprises receiving the feedback information; and
the apparatus further comprises means for processing at least a portion of the feedback information during the second TTI to determine whether to retransmit the data.

28. The apparatus of claim 25, wherein the communication of the feedback information comprises hybrid automatic repeat request (HARQ) communication.

29. The apparatus of claim 25, further comprising means for selecting a length of each of the first TTI and the second TTI to match a processing and acknowledgement time interval.

30. A non-transitory computer-readable medium storing computer-executable code for wireless communication by an apparatus, the medium including code to:
communicate data during a first transmission time interval (TTI) that comprises a plurality of symbol time periods including a first symbol time period that precedes any other symbol time period of the plurality of symbol time periods of the first TTI;
communicate pilot information via a first frequency band during the first symbol time period;
communicate control information via a second frequency band during the first symbol time period; and
communicate feedback information based on the data during a second TTI that comprises a plurality of symbol time periods and follows the first TTI.

31. A method of wireless communication by an apparatus, the method comprising:
communicating first data during a first transmission time interval (TTI) that has a first duration;
communicating second data according to a first turn-around time relative to a beginning of the first TTI;
communicating third data during a second TTI that comprises a plurality of symbol time periods, wherein the second TTI has a second duration that is different from the first duration; and
communicating fourth data according to a second turn-around time relative to a beginning of the second TTI, wherein a difference between the first turn-around time and the second turn-around time is a non-linear function of a difference between the first duration and the second duration.

32. The method of claim 31, wherein:
the communicating of the third data comprises receiving the third data;
the method further comprises transmitting feedback information; and
the method further comprises processing at least a portion of the third data during the second TTI to generate the feedback information.

33. The method of claim 32, further comprising:
processing at least another portion of the third data during a third TTI that follows the second TTI to generate additional feedback information; and
communicating the additional feedback information.

34. The method of claim 32, wherein:
the feedback information comprises channel state feedback information; and
the method further comprises processing the third data to generate the channel state feedback information.

35. The method of claim 31, wherein:
the communicating of the third data comprises transmitting the third data;
the method further comprises receiving feedback information; and
the method further comprises processing at least a portion of the feedback information during the second TTI to determine whether to retransmit the third data.

36. The method of claim 35, further comprising:
processing at least another portion of the third data during a third TTI that follows the second TTI to determine whether to retransmit the third data.

37. The method of claim 35, wherein:
the feedback information comprises channel state feedback information; and
the method further comprises processing the channel state feedback information to determine whether to retransmit the third data.

38. The method of claim 32, wherein the feedback information comprises pilot information and acknowledgement information.

39. The method of claim 38, wherein the pilot information and the acknowledgement information are communicated during a common symbol period.

40. The method of claim 31, wherein the data comprises mission critical traffic.

41. The method of claim 32, wherein the transmission of the feedback information comprises hybrid automatic repeat request (HARQ) communication.

42. The method of claim 41, wherein the second TTI is further associated with a time period for the HARQ communication being spread over a plurality of TTIs.

43. The method of claim 32, wherein the feedback information comprises a plurality of acknowledgement indications.

44. The method of claim 32, wherein the feedback information comprises a plurality of pilot indications.

45. The method of claim 31, further comprising selecting a length of the second TTI to match a processing and acknowledgement time interval.

46. An apparatus for wireless communication comprising:
a memory device; and
a processing circuit coupled to the memory device and configured to:
communicate first data during a first transmission time interval (TTI) that has a first duration;
communicate second data according to a first turn-around time relative to a beginning of the first TTI;
communicate third data during a second TTI that comprises a plurality of symbol time periods, wherein the second TTI has a second duration that is different from the first duration; and
communicate fourth data according to a second turn-around time relative to a beginning of the second TTI, wherein a difference between the first turn-around time and the second turn-around time is a non-linear function of a difference between the first duration and the second duration.

47. The apparatus of claim 46, wherein:
the communicating of the third data comprises receiving the third data;
the processing circuit is further configured to transmit feedback information; and
the processing circuit is further configured to process at least a portion of the third data during the second TTI to generate the feedback information.

48. The apparatus of claim 47, wherein the processing circuit is further configured to:
process at least another portion of the third data during a third TTI that follows the second TTI to generate additional feedback information; and
communicate the additional feedback information.

49. The apparatus of claim 47, wherein:
the feedback information comprises channel state feedback information; and
the processing circuit is further configured to process the third data to generate the channel state feedback information.

50. The apparatus of claim 46, wherein:
the communicating of the third data comprises transmitting the third data;
the processing circuit is further configured to receive feedback information; and
the processing circuit is further configured to process at least a portion of the feedback information during the second TTI to determine whether to retransmit the third data.

51. The apparatus of claim 50, wherein the processing circuit is further configured to:

at least another portion of the third data during a third TTI that follows the second TTI to determine whether to retransmit the third data.

52. The apparatus of claim 50, wherein:
the feedback information comprises channel state feedback information; and
the processing circuit is further configured to process the channel state feedback information to determine whether to retransmit the third data.

53. The apparatus of claim 47, wherein the transmission of the feedback information comprises hybrid automatic repeat request (HARQ) communication.

54. The apparatus of claim 46, wherein the processing circuit is further configured to:
select a length of the second TTI to match a processing and acknowledgement time interval.

55. An apparatus for wireless communication comprising:
means for communicating first data during a first transmission time interval (TTI) that has a first duration;
means for communicating second data according to a first turn-around time relative to a beginning of the first TTI;
means for communicating third data during a second TTI that comprises a plurality of symbol time periods, wherein the second TTI has a second duration that is different from the first duration; and
means for communicating fourth data according to a second turn-around time relative to a beginning of the second TTI, wherein a difference between the first turn-around time and the second turn-around time is a non-linear function of a difference between the first duration and the second duration.

56. The apparatus of claim 55, wherein:
the communicating of the third data comprises receiving the third data;
the apparatus further comprises means for transmitting feedback information; and
the apparatus further comprises means for processing at least a portion of the third data during the second TTI to generate the feedback information.

57. The apparatus of claim 55, wherein:
the communicating of the third data comprises transmitting the third data;
the apparatus further comprises means for receiving feedback information; and
the apparatus further comprises means for processing at least a portion of the feedback information during the second TTI to determine whether to retransmit the third data.

58. The apparatus of claim 56, wherein the transmission of the feedback information comprises hybrid automatic repeat request (HARQ) communication.

59. The apparatus of claim 55, further comprising means for selecting a length of the second TTI to match a processing and acknowledgement time interval.

60. A non-transitory computer-readable medium storing computer-executable code for wireless communication by an apparatus, the medium including code to:
communicate first data during a first transmission time interval (TTI) that has a first duration;
communicate second data according to a first turn-around time relative to a beginning of the first TTI;
communicate third data during a second TTI that comprises a plurality of symbol time periods, wherein the second TTI has a second duration that is different from the first duration; and
communicate fourth data according to a second turn-around time relative to a beginning of the second TTI, wherein a difference between the first turn-around time and the second turn-around time is a non-linear function of a difference between the first duration and the second duration.

* * * * *